US012593137B2

(12) United States Patent
Fukui

(10) Patent No.: US 12,593,137 B2
(45) Date of Patent: Mar. 31, 2026

(54) CONTROL DEVICE FOR IMAGING DEVICE, IMAGING DEVICE, IMAGING METHOD, AND STORAGE MEDIUM

(71) Applicant: CANON KABUSHIKI KAISHA, Tokyo (JP)

(72) Inventor: Takaaki Fukui, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/398,019

(22) Filed: Dec. 27, 2023

(65) Prior Publication Data

US 2024/0236507 A1 Jul. 11, 2024

(30) Foreign Application Priority Data

Jan. 6, 2023 (JP) ................................. 2023-000821

(51) Int. Cl.
| | |
|---|---|
| *H04N 23/81* | (2023.01) |
| *H04N 23/61* | (2023.01) |
| *H04N 23/62* | (2023.01) |
| *H04N 23/667* | (2023.01) |
| *H04N 23/67* | (2023.01) |
| *H04N 23/71* | (2023.01) |
| *H04N 23/73* | (2023.01) |

(52) U.S. Cl.
CPC ............. *H04N 23/81* (2023.01); *H04N 23/61* (2023.01); *H04N 23/62* (2023.01); *H04N 23/667* (2023.01); *H04N 23/675* (2023.01); *H04N 23/71* (2023.01); *H04N 23/73* (2023.01)

(58) Field of Classification Search
CPC ........ H04N 23/81; H04N 23/61; H04N 23/62; H04N 23/667; H04N 23/675; H04N 23/71; H04N 23/73; H04N 23/64
See application file for complete search history.

(56) References Cited

U.S. PATENT DOCUMENTS

| | | | | |
|---|---|---|---|---|
| 8,917,332 B2 * | 12/2014 | Ono | ....................... | H04N 23/71 |
| | | | | 348/222.1 |
| 8,989,453 B2 * | 3/2015 | Steinberg | ............... | H04N 23/84 |
| | | | | 382/162 |
| 10,567,638 B2 * | 2/2020 | Tsuchiya | ............... | H04N 23/72 |

FOREIGN PATENT DOCUMENTS

JP 2019106694 A 6/2019

* cited by examiner

*Primary Examiner* — Ahmed A Berhan
(74) *Attorney, Agent, or Firm* — Canon U.S.A., Inc., IP Division

(57) ABSTRACT

An imaging device includes an object detection unit configured to detect an object from an image acquired from an imaging unit and a control unit configured to control an automated imaging process of the imaging unit on the basis of a result of detecting the object. The control unit has a first automated imaging mode in which the automated imaging process is performed using a focal length in a range of a prescribed value or more and a second automated imaging mode in which the automated imaging process is performed by limiting the focal length to less than the prescribed value.

17 Claims, 17 Drawing Sheets

FIG. 5

FIG. 10B
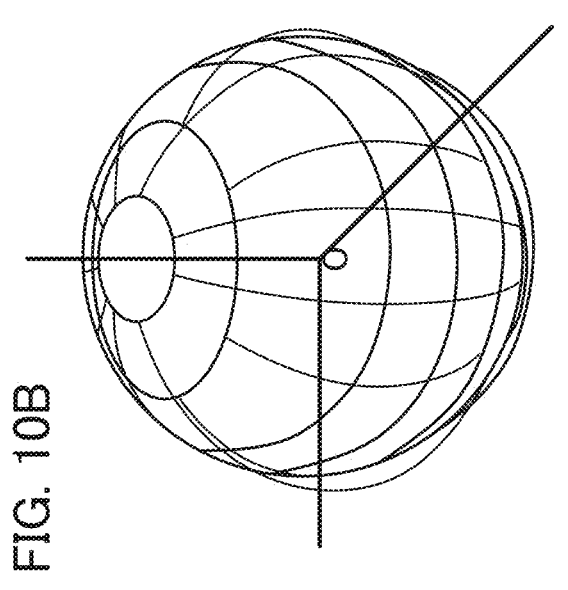
FIG. 10A
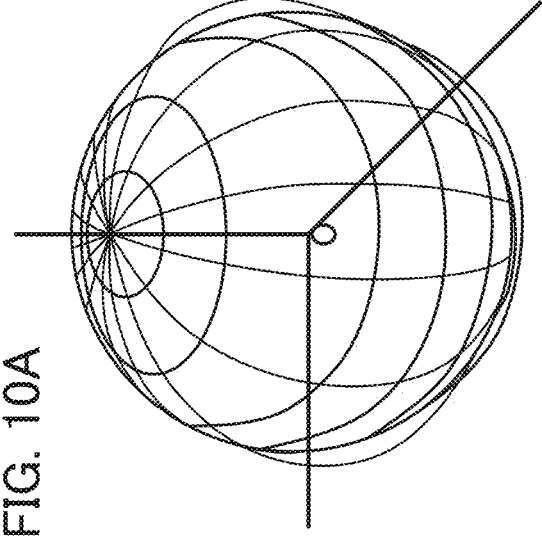
FIG. 10C
FIG. 10D
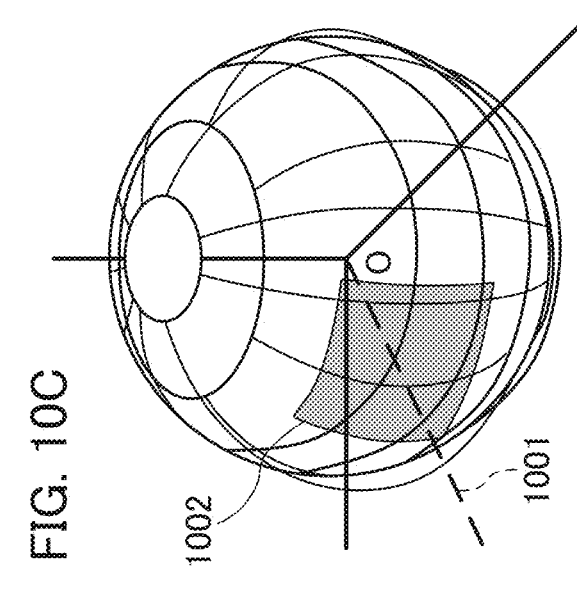

FOCAL LENGTH AND F-NUMBER

GRADATION CHARACTERISTICS

CONTROL DEVICE FOR IMAGING DEVICE, IMAGING DEVICE, IMAGING METHOD, AND STORAGE MEDIUM

BACKGROUND OF THE DISCLOSURE

Field

The present disclosure relates to a control device for an imaging device, the imaging device, an imaging method, a storage medium, and the like.

Description of the Related Art

In still- and moving-image capturing processes using an imaging device such as a camera, a user captures an image normally by deciding on an imaging target through a viewfinder or the like, confirming an imaging situation himself/herself, and adjusting the framing of the captured image. In this imaging device, there is a conventional mechanism for controlling the camera so that the camera is in a state suitable for imaging.

For an imaging device that executes imaging according to an operation of this user, there are also known cameras having a camera platform in which panning and tilting are possible on a camera body and a zoom function (hereinafter referred to as a pan-tilt-zoom (PTZ) function). Also, there is an automated imaging camera that controls the PTZ function of the camera to detect an object such as a person around the camera and periodically and continuously image the detected object (hereinafter referred to as an automated imaging camera).

For example, Japanese Patent Laid-Open No. 2019-106694 proposes a camera that can cause a zoom process to be performed by rotating a direction of a lens barrel of the camera in pitch and yaw directions and controlling a focal length of the lens barrel using a camera platform.

Because these automated imaging cameras perform imaging at certain time intervals or timings when the object is detected without imaging being performed by pushing an imaging button at a timing intended by the user, the natural expressions and unexpected moments of children whose imaging is usually difficult can be captured as videos.

Automated imaging cameras with a camera platform function as disclosed in Japanese Patent Laid-Open No. 2019-106694 are often used in indoor environments such as children's rooms and living rooms. Also, because the object to be imaged is imaged without being aware of the camera, it is desirable to perform imaging at a high-speed time so that the object is not blurred.

The images to be captured are often captured using an optical zoom so that the size of a face is larger than or equal to a certain size and the images are often captured with a large F-number by performing a zoom process. Such indoor imaging environments and imaging settings result in noisy images because imaging is performed at high sensitivity.

Also, the above-described PTZ camera often has a dome-shaped protective cover on the front surface or the entire surface of the camera to prevent a foreign substance from getting caught in a camera platform mechanism in the lens barrel. However, a distance between the camera and a lighting device such as a fluorescent lamp or a light bulb indoors is short and light of the lighting device is reflected on the protective cover, which tends to cause a flare phenomenon.

The image with high-sensitivity imaging and flare phenomenon becomes an image in which black floating occurs, the contrast or chroma is low, and an overall foggy appearance is shown, and it is difficult to obtain a preferable image.

SUMMARY OF THE DISCLOSURE

According to the present disclosure, a control device for an imaging device includes at least one processor configured to function as: an object detection unit configured to detect an object from an image acquired from an imaging unit; and a control unit configured to control an automated imaging process of the imaging unit on the basis of a result of detecting the object, wherein the control unit has a first automated imaging mode in which the automated imaging process is performed using a focal length in a range of a prescribed value or more and a second automated imaging mode in which the automated imaging process is performed by limiting the focal length to less than the prescribed value.

Further features of the present disclosure will become apparent from the following description of embodiments with reference to the attached drawings.

BRIEF DESCRIPTION OF THE DRAWINGS

FIG. 5 is a functional block diagram showing an example of an internal configuration of the smart device 401 according to the first embodiment.

FIGS. 10A to 10D are diagrams for describing imaging area detection in the automated imaging process in the first embodiment.

DESCRIPTION OF THE EMBODIMENTS

Figure 1A:
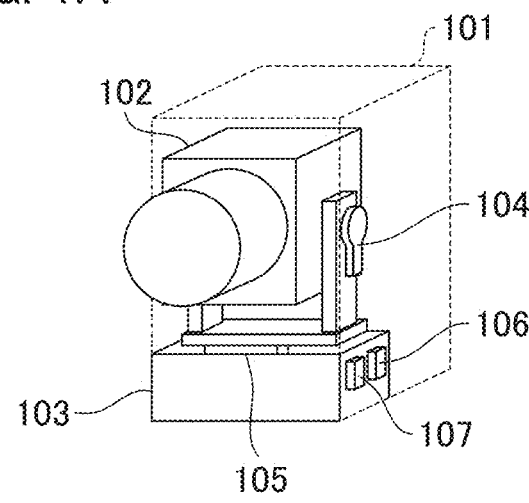
FIG. 1A to 1C are diagrams for describing examples of a configuration of an imaging device according to a first embodiment.

Hereinafter, embodiments of the present disclosure will be described with reference to the drawings. However, the present disclosure is not limited to the following embodiments. In the drawings, the same reference signs are given for the same members or elements, and redundant descriptions thereof are omitted or simplified.

First Embodiment

In the first embodiment, an imaging device in consideration of these problems will be described.

Figure 1B:
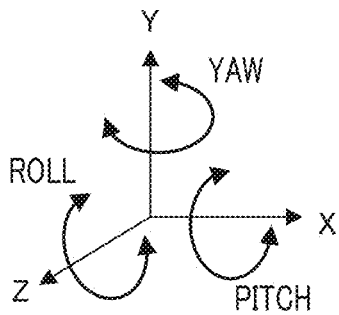
Figure 1C:
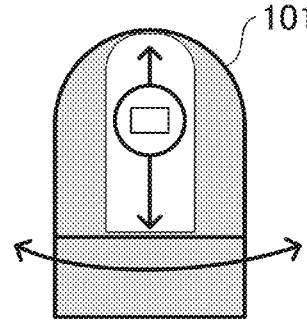

FIGS. 1A to 1C are diagrams for describing an example of a configuration of an imaging device according to the first embodiment. FIG. 1A is a perspective view of the imaging device according to the first embodiment and FIG. 1B is a diagram showing an axis definition at a position of a fixing unit 103.

An operation member (hereinafter referred to as a power-supply button) for operating a power-supply switch and the like are provided in the imaging device 101. A power supply may be turned on and off by performing a tapping, flicking, or swiping operation or the like on a touch panel.

A lens barrel 102, which is a housing including an imaging lens group and an imaging element for performing imaging, is attached to the imaging device 101, and a rotation mechanism capable of rotationally driving the lens barrel 102 with respect to the fixing unit 103 is provided. A tilt rotation unit 104 is a motor drive mechanism capable of rotating the lens barrel 102 in a pitch direction shown in FIG. 1B and a pan rotation unit 105 is a motor drive mechanism capable of rotating the lens barrel 102 in a yaw direction. Thus, the lens barrel 102 can be rotated in one or more directions.

Both an angular velocity meter 106 and an accelerometer 107 are mounted on the fixing unit 103 of the imaging device 101. Also, the vibration of the imaging device 101 is detected on the basis of the detection results (a blur angle and the like) of the angular velocity meter 106 and the accelerometer 107 and the tilt rotation unit 104 and the pan rotation unit 105 are rotationally driven on the basis of the detected blur angle. Thereby, the shaking of the lens barrel 102, which is a movable unit, is corrected and the tilt is corrected.

FIG. 1C is a diagram showing a dome-shaped transparent cover attached to a lens barrel portion of a main body with respect to the configuration shown in FIG. 1A. The dome-shaped transparent cover prevents a foreign substance such as dust or sand from entering the lens barrel 102.

Figure 2:
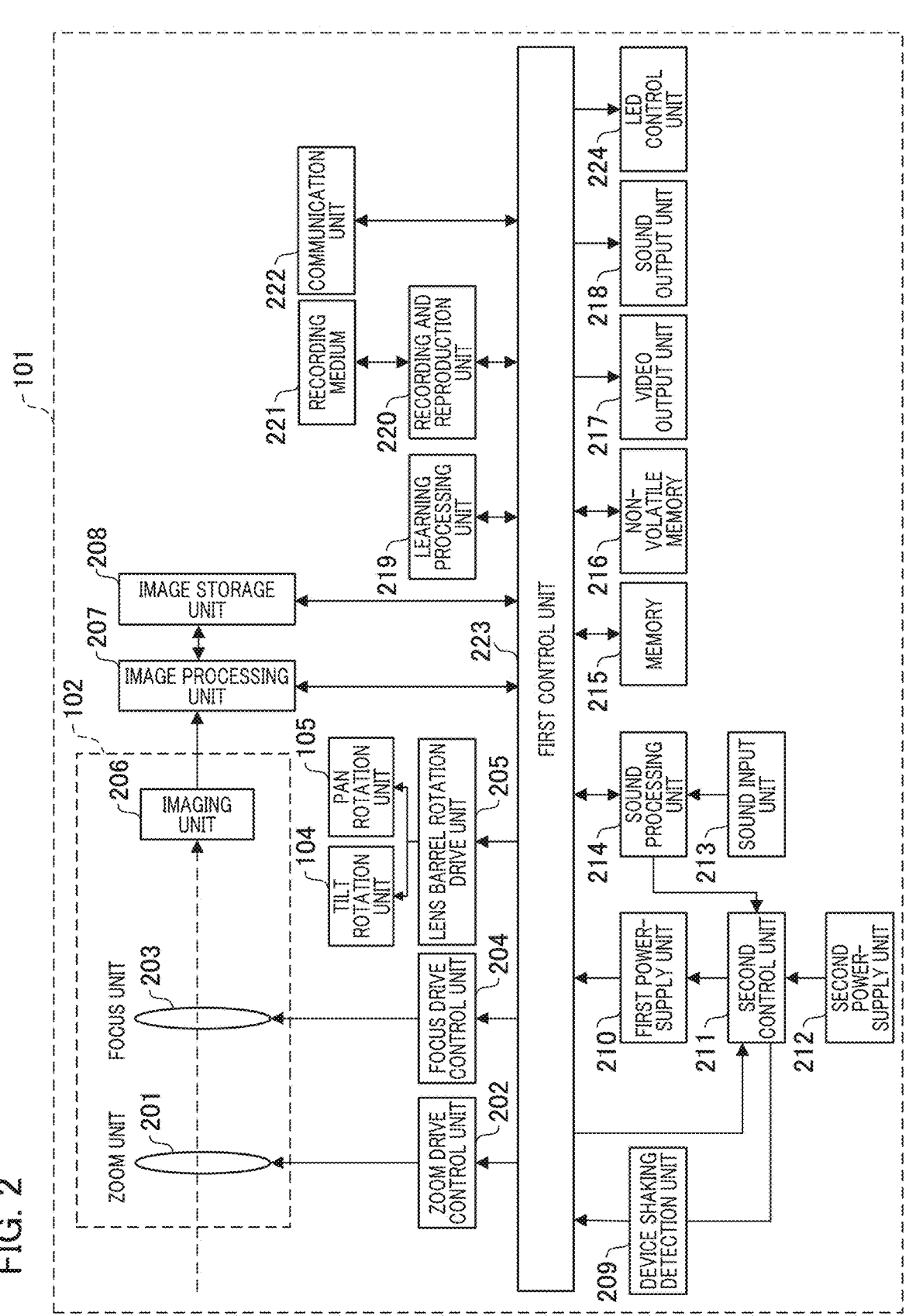
FIG. 2 is a functional block diagram showing an example of an internal configuration of the imaging device according to the first embodiment.

FIG. 2 is a functional block diagram showing an example of an internal configuration of the imaging device according to the first embodiment. Furthermore, a part of the functional block shown in FIG. 2 is implemented by a central processing unit (CPU) or the like as a computer (not shown) included in the device executing a computer program stored in a memory as a storage medium.

However, a part or all of the functional block may be implemented by hardware. As hardware, a dedicated circuit (an application-specific integrated circuit (ASIC)) or a processor (a reconfigurable processor (a digital signal processor (DSP)) can be used.

Also, functional blocks shown in FIG. 2 may not be built into the same housing and may be configured by separate devices connected to each other via a signal path. Furthermore, the above description of FIG. 2 similarly applies to FIGS. 3 and 5.

In FIG. 2, a first control unit 223 includes a processor (for example, a CPU, a graphics processing unit (GPU), a microprocessor, a microprocessor unit (MPU), or the like) as a computer, a memory (for example, a dynamic random-access memory (DRAM), a static random access memory (SRAM), or the like) and functions as a control unit (a control device).

The computer within the first control unit 223 controls each block of the imaging device 101 by executing a computer program stored in the memory or controls data transfer between the blocks. The non-volatile memory (electrically erasable programmable read-only memory (EE-PROM)) 216 is a memory capable of being electrically erased and recorded and stores constants, programs, and the like for the operation of the first control unit 223.

In FIG. 2, a zoom unit 201 includes a zoom lens that performs variable magnification. A zoom drive control unit 202 drives and controls the zoom unit 201. A focus unit 203 includes a focus lens that performs a focus adjustment. A focus drive control unit 204 drives and controls the focus unit 203.

An imaging unit 206 includes an imaging element such as a complementary metal-oxide-semiconductor (CMOS) image sensor. The imaging element receives light of an object image through each lens group and outputs an electrical signal corresponding to the object image as analog image data to an image processing unit 207.

The image processing unit 207 converts analog image data in an analog-to-digital (A/D) conversion process and outputs digital image data obtained by performing image processing such as distortion correction, a white balance adjustment, or a color interpolation process. Thus, the imaging device in the first embodiment includes an imaging unit and a control device for the imaging device.

The digital image data output from the image processing unit 207 is converted into a recording format such as a Joint Photographic Experts Group (JPEG) format by an image recording unit 208 and the converted digital image data is transmitted to a memory 215 and a video output unit 217 to be described below.

A lens barrel rotation drive unit 205 drives the tilt rotation unit 104 and the pan rotation unit 105 to drive the lens barrel 102 in the tilt direction and the pan direction. Here, the lens barrel rotation drive unit 205 functions as an imaging direction control unit that changes the imaging direction of the imaging unit on the basis of a control process of the control unit.

A device shaking detection unit 209 includes, for example, the angular velocity meter (gyro sensor) 106 that detects an angular velocity in the three axes of the imaging device 101 and the accelerometer (acceleration sensor) 107 that detects acceleration in three-axis directions of the device. The device shaking detection unit 209 calculates a rotation angle of the device, a shift amount of the device, and the like on the basis of a detected signal.

A sound input unit 213 acquires a sound signal around the imaging device 101 using, for example, a plurality of microphones, performs an A/D conversion process for the sound signal, and supplies a result of the A/D conversion process as a digital sound signal to a sound processing unit 214. The sound processing unit 214 performs a process such as noise correction of the digital sound signal. The sound signal processed by the sound processing unit 214 is temporarily stored in the memory 215 via the first control unit 223.

The image processing unit 207 and the sound processing unit 214 read the image signal and the sound signal temporarily stored in the memory 215, encode the image signal and the sound signal, and generate a compressed image signal and a compressed sound signal. The first control unit 223 supplies the compressed image signal and the compressed sound signal to a recording and reproduction unit 220 and records the compressed image signal, the compressed sound signal, other imaging-related control data, and the like on a recording medium 221.

The recording medium 221 may be a recording medium built into the imaging device 101 or a removable recording medium. The recording medium 221 includes, for example, any form of recording medium such as a hard disk, an optical disc, a magneto-optical disc, a compact disc recordable (CD-R), a digital versatile disc-recordable (DVD-R), a magnetic tape, a non-volatile semiconductor memory, or a flash memory.

The recording and reproduction unit 220 can read compressed image signals, compressed sound signals, various data, programs, and the like recorded on the recording medium 221, and supply them to the video output unit 217 and the sound output unit 218 via the image processing unit 207 and the sound processing unit 214.

Furthermore, the sound processing unit 214 can detect a specific sound command. In addition to commands registered in advance, sound commands may be configured so that the user can register a specific sound in the imaging device.

The second control unit 211 is provided separately from the first control unit 223 that controls an overall main system of the imaging device 101 and controls the supply power of the first control unit 223. The first power-supply unit 210 and the second power-supply unit 212 supply power for operating the first control unit 223 and the second control unit 211, respectively.

By pressing a power-supply button provided on the imaging device 101, power is first supplied to both the first control unit 223 and the second control unit 211. As will be described below, the first control unit 223 can also control the first power-supply unit 210 so that its own power supply is turned off.

Even if the first control unit 223 is not operating, the second control unit 211 is operating and information from the device shaking detection unit 209 and the sound processing unit 214 is input. The second control unit performs a process of determining whether or not to activate the first control unit 223 on the basis of various types of input information and issues a power supply instruction to the first power-supply unit when the activation determination is performed.

The sound output unit 218 can output a pre-set sound pattern from a speaker built into the imaging device 101, for example, during imaging. A light-emitting diode (LED) control unit 224 turns on and controls an LED provided in the imaging device 101 in a preset lighting and flashing pattern, for example, during imaging.

The video output unit 217 includes, for example, a video output terminal, and transmits an image signal for displaying an image on a connected external display or the like. Also, the sound output unit 218 and the video output unit 217 may include one combined terminal, for example, a terminal like an HDMI (registered trademark) (high-definition multimedia interface) terminal.

The communication unit 222 performs communication between the imaging device 101 and the external device and transmits and receives data such as, for example, a sound signal, an image signal, a compressed sound signal, and a compressed image signal. Also, control signals related to imaging, such as imaging start and end commands, and pan/tilt and zoom drive, can be received from the external device to drive the imaging device 101.

The communication unit 222 is, for example, a wireless communication module such as an infrared communication module, a Bluetooth (registered trademark) communication module, a wireless local area network (LAN) communication module, a wireless universal serial bus (USB), or a Global Positioning System (GPS) receiver. The communication unit 222 receives the captured image and transmits the captured image to an external device that evaluates the object blur of the received captured image.

Figure 3:
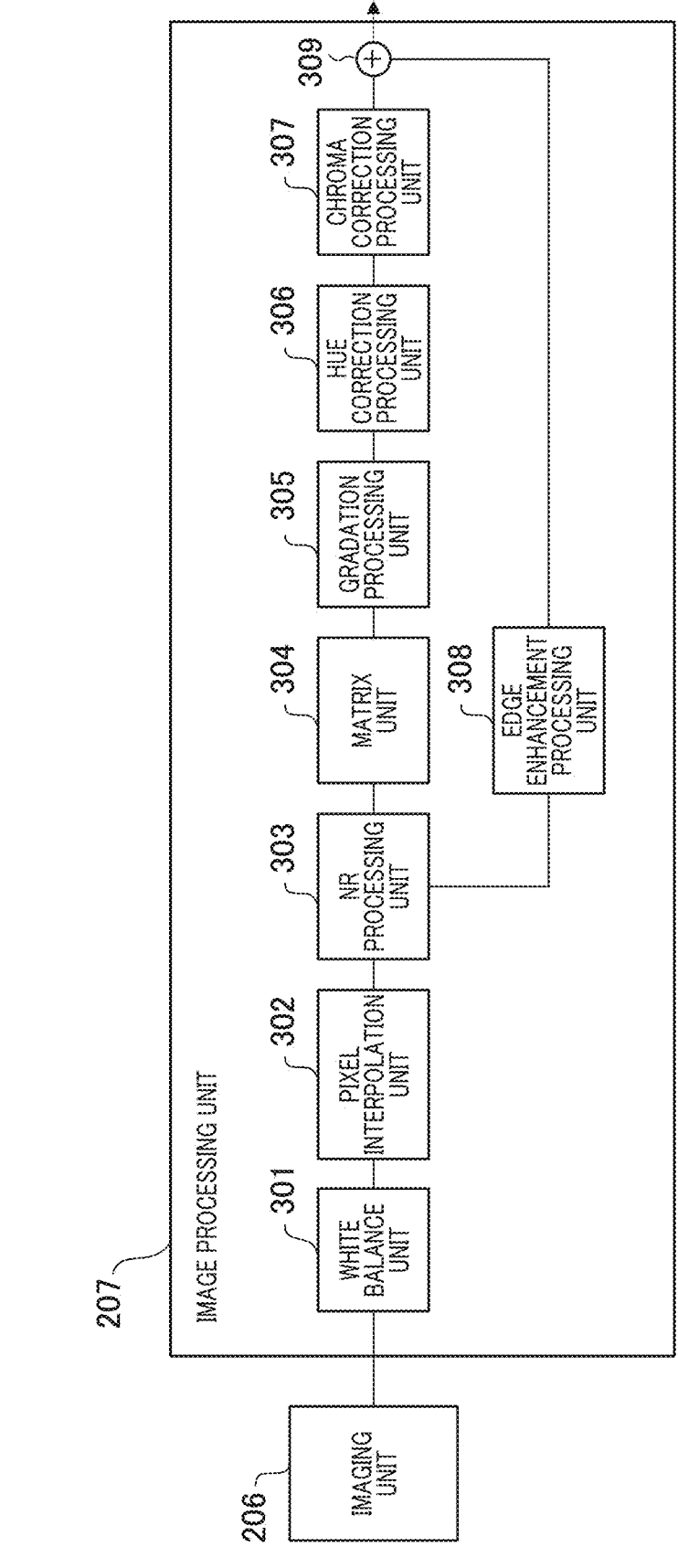
FIG. 3 is a functional block diagram showing an example of a configuration of an image processing unit 207 according to the first embodiment.

FIG. 3 is a functional block diagram showing an example of a configuration of the image processing unit 207 in the first embodiment. A RAW signal captured from the imaging unit 206 is white-balance-corrected in the white balance unit 301 and Bayer interpolation is performed by the pixel interpolation unit 302 to simultaneously convert RGB signals of all pixels.

The simultaneous signals are objected to a noise reduction (NR) process to reduce noise in an NR processing unit 303. The NR-processed signal is branched in two directions. In one direction, matrix processing for adjusting color reproduction in a matrix unit 304 is performed.

A gradation processing unit 305 performs a gradation correction process for a matrix-processed signal. In general, the gradation of a JPEG image is processed, for example, using a $\gamma$ value of 1/2.4 in an sRGB color space.

However, in order to increase the contrast of the image, the dark part may be set to be slightly dark with respect to the curve of 1/2.4 which is the $\gamma$ value. Alternatively, gradation conversion characteristics may be set to have a curve gentler than a gamma curve of an sRGB standard from the halftone to a saturation part so that the gradation of the saturation part is outgoing.

Also, the gradation conversion process is performed and a bit-down process from a high-bit signal of a RAW format to 8 bits of a JPEG format is performed. An RGB signal obtained by performing a gradation conversion process is converted into a YUV signal in a hue correction processing unit 306 and hue correction is performed by performing matrix processing on the UV signal.

A chroma correction processing unit 307 determines a color intensity of the image by multiplying a gain by a hue-corrected UV signal. When the chroma correction process is performed, a high-chroma suppression process is performed to avoid color saturation occurring even in a high-chroma region.

On the other hand, an edge enhancement processing unit 308 performs an edge enhancement process for the signal output from the NR processing unit 303. An edge signal generated in the edge enhancement process is added to the output of the chroma correction processing unit 307 in the adder 309 and an addition result is output as a YUV signal.

Furthermore, the white balance in the white balance unit 301 can be adjusted to control the creation of the captured image and the sharpness or NR setting can be adjusted by the NR processing unit 303 or the edge enhancement processing unit 308. Also, color reproduction can be adjusted by the matrix unit 304, the gradation characteristics can be adjusted by the gradation processing unit 305, the hue setting can be adjusted by the hue correction processing unit 306, and the chroma setting can be adjusted by the chroma correction processing unit 307.

Figure 4:
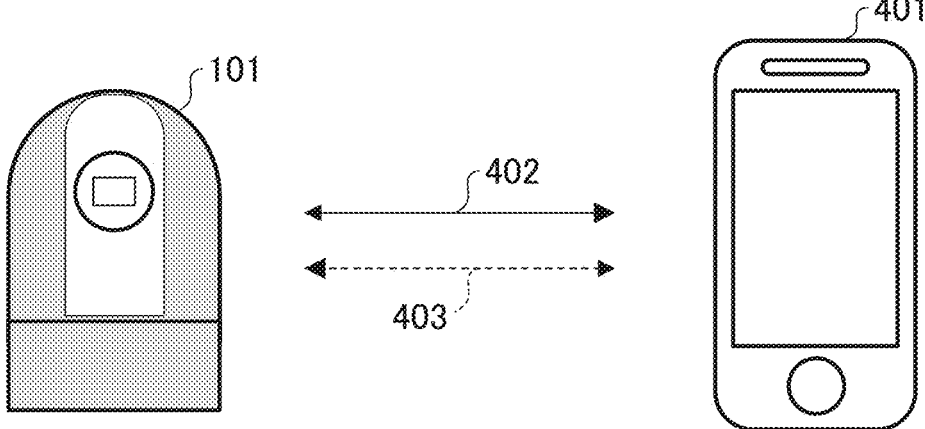
FIG. 4 is a diagram showing an example of a configuration of a wireless communication system for an imaging device 101 and a smart device 401 according to the first embodiment.

FIG. 4 is a diagram showing an example of a configuration of a wireless communication system between the imaging device 101 and the smart device 401 according to the first embodiment. The imaging device 101 is a digital camera having an imaging function. Reference numeral 401 denotes a smart device including a Bluetooth communication module and a wireless LAN communication module. In the following description, the imaging device 101 may be referred to as a camera.

The imaging device 101 and the smart device 401, for example, can perform communication through first communication 402 based on a wireless LAN conforming to the Institute of Electrical and Electronics Engineers (IEEE) 802.11 standard series and second communication 403 having a master-servant relationship between a control station, a subordinate station, and the like, such as, for example, Bluetooth low energy (hereinafter referred to as "BLE").

The wireless LAN and the BLE are examples of a communication method and each communication device has two or more communication functions, and another communication method may be used if another communication function can be controlled through, for example, one communication function of performing communication in a relationship between a control station and a subordinate station.

However, the first communication 402 of the wireless LAN or the like can be performed at a higher speed than the second communication of the BLE or the like and it is assumed that the second communication 403 has at least one of power consumption less than that of the first communication and a possible communication distance shorter than that of the first communication.

Figure 5:
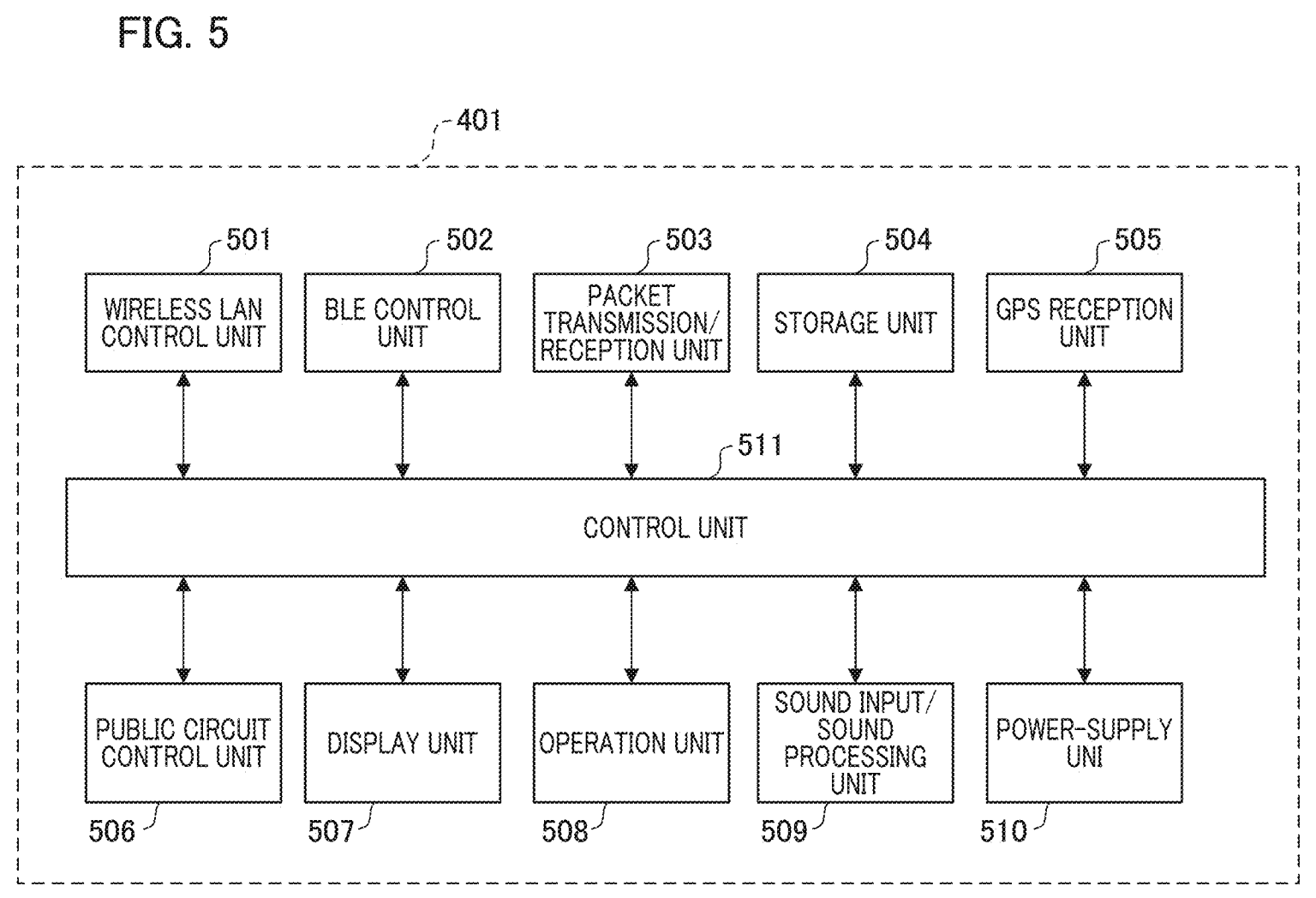

An example of a configuration of the smart device 401 will be described with reference to FIG. 5. FIG. 5 is a functional block diagram showing an example of an internal configuration of the smart device 401 according to the first embodiment. The smart device 401 includes, for example, a wireless LAN control unit 501 for the wireless LAN, a BLE control unit 502 for the BLE, and a public circuit control unit 506 for public wireless communication.

Also, the smart device 401 further includes a packet transmission/reception unit 503. The wireless LAN control unit 501 performs radio frequency (RF) control of the wireless LAN, a communication process, and a protocol process related to communication based on a driver, which performs various types of control of communication based on a wireless LAN conforming to the IEEE 802.11 standard series, and the wireless LAN.

The BLE control unit 502 performs RF control of the BLE, a communication process, and a protocol process related to communication based on a driver, which performs various types of control of communication based on the BLE, and the BLE. The public circuit control unit 506 performs RF control of public wireless communication, a communication process, and a protocol process related to a driver for performing various types of control of public wireless communication and the public wireless communication.

The public wireless communications conform to, for example, international multimedia telecommunications (IMT) standards, long term evolution (LTE) standards, and the like.

The packet transmission/reception unit 503 performs a process of executing at least one of transmission and reception of packets related to communication based on the wireless LAN and the BLE and the public wireless communication. Although a case where the smart device 401 performs at least one of packet transmission and reception in communication will be described in the present example, another communication format such as circuit switching may be used in addition to packet switching.

The smart device 401 further includes, for example, a control unit 511, a storage unit 504, a GPS reception unit 505, a display unit 507, an operation unit 508, a sound input/sound processing unit 509, and a power-supply unit 510. The CPU or the like as a computer (not shown) in the control unit 511 controls the entire smart device 401 by executing a computer program stored in the storage unit 504.

The storage unit 504 stores, for example, a computer program executed by the control unit 511 and various types of information such as parameters necessary for communication. Furthermore, the process in each flowchart to be described below is implemented by the CPU or the like executing a computer program stored in the storage unit 504 as a computer within the control unit 511.

The power-supply unit 510 supplies power to the smart device 401. The display unit 507 has a function of enabling visually recognizable information to be output as in a liquid crystal display (LCD) or an LED, or a function in which a sound output of a speaker is possible, and displays various types of information.

The operation unit 508 is, for example, a button for receiving an operation on the smart device 401 from the user. The display unit 507 and the operation unit 508 may include a common member such as a touch panel.

The sound input/sound processing unit 509, for example, may be configured to acquire a user-uttered sound from a general-purpose microphone built in the smart device 401 and acquire a user operation instruction in a sound recognition process.

Also, a sound command is acquired by the user's pronunciation via a dedicated application within the smart device. Also, the sound command can be registered as a specific sound command for causing the sound processing unit 214 of the imaging device 101 to recognize a specific sound command via the first communication 402 based on the wireless LAN.

The GPS reception unit 505 receives a GPS signal of a notification from a satellite, analyzes the GPS signal, and estimates a current position (longitude/latitude information) of the smart device 401.

Alternatively, the position estimation may use a Wi-Fi positioning system (WPS) or the like to estimate the current position of the smart device 401 on the basis of information of a wireless network that is located nearby.

If the acquired current GPS position information is located in a preset position range (within a prescribed radius range), a notification of movement information is provided to the imaging device 101 via the BLE control unit 502 and used as a parameter for automated imaging or automated editing to be described below. Also, if there is a prescribed position change or more in the GPS position information, a notification of the movement information is provided to the imaging device 101 via the BLE control unit 502 and used as a parameter for automated imaging and automated editing to be described below.

As described above, the smart device 401 exchanges data with the imaging device 101 through communication using the wireless LAN control unit 501 and the BLE control unit 502, and transmits and receives data such as a sound signal, an image signal, a compressed sound signal, and a compressed image signal. Also, a process of an operation instruction for an imaging process of the imaging device 101 from the smart device 401, the transmission of sound command registration data, and a prescribed position detection notification process and a location movement notification process based on GPS position information are performed.

Figure 6:
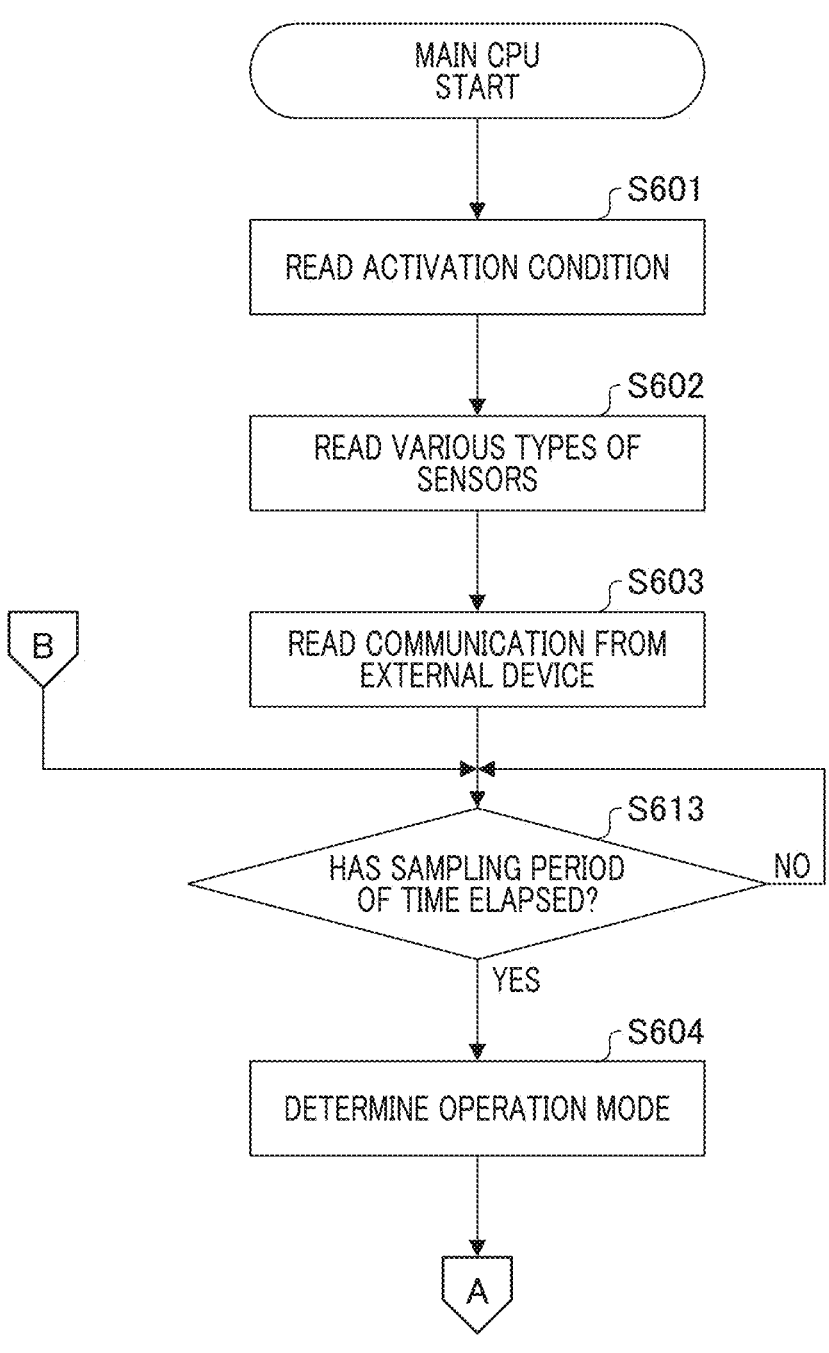
FIG. 6 is a flowchart for describing an example of an operation of a first control unit 223 of the imaging device according to the first embodiment.
Figure 7:
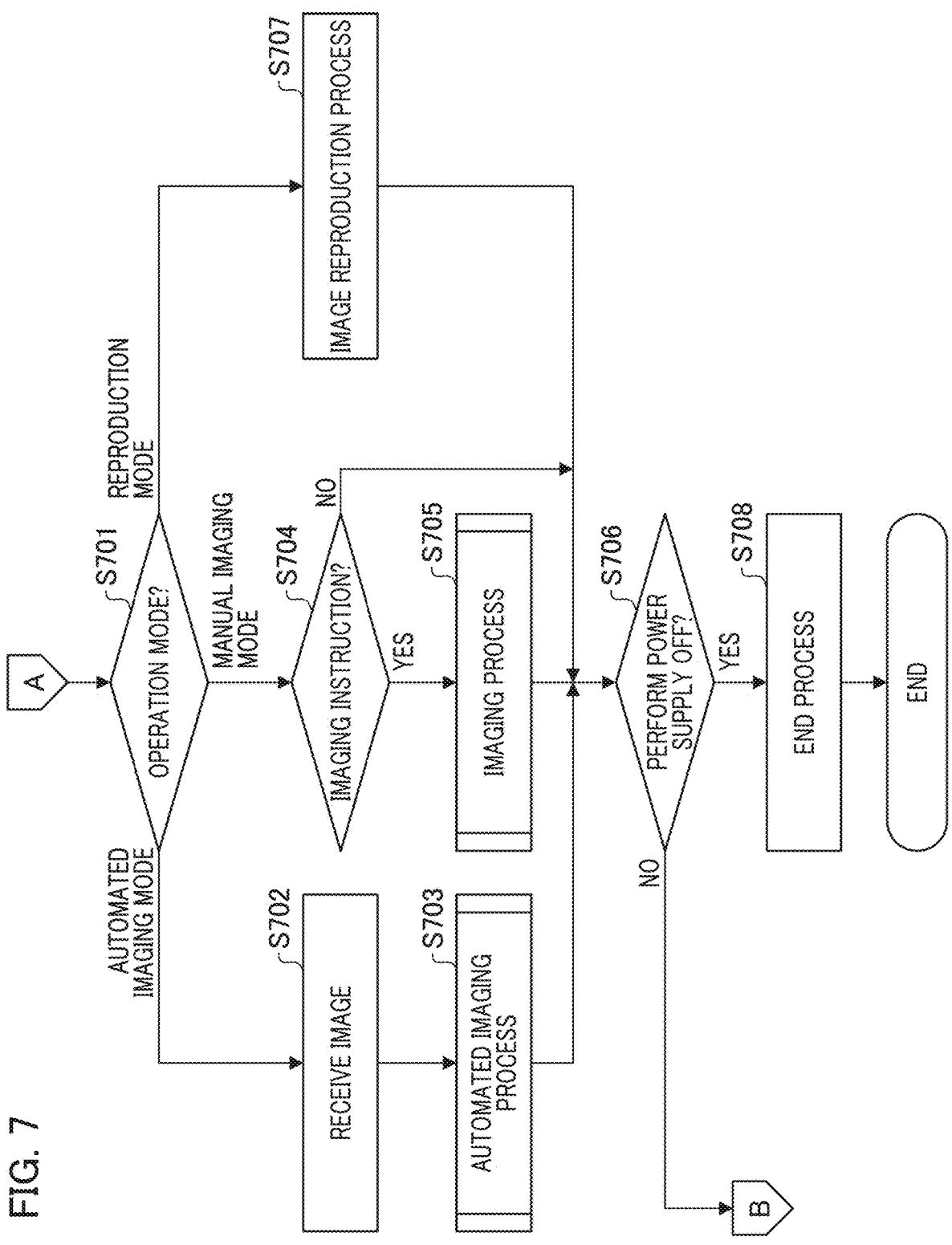
FIG. 7 is a flowchart subsequent to FIG. 6.

FIG. 6 is a flowchart for describing an example of an operation of the first control unit 223 of the imaging device according to the first embodiment and FIG. 7 is a flowchart subsequent to FIG. 6. Furthermore, the CPU or the like as a computer in the imaging device executes a computer program stored in the memory to perform operations in steps of the flowchart of FIGS. 6 and 7.

When the user operates the power-supply button provided on the imaging device 101, power is supplied from the power-supply unit to the first control unit 223 and each block of the imaging device 101 by the first power-supply unit 210 in step S601. When power is supplied, the imaging device 101 is activated and an activation condition is read in step S501.

In step S602, outputs of various types of sensors are read. The output of the sensor read here includes an output of a gyro sensor, an acceleration sensor, or the like from the device shaking detection unit 209, an output of a sensor (not shown) that detects a rotation position of the tilt rotation unit 104 or the pan rotation unit 105, and the like.

Furthermore, outputs such as a sound level detected by the sound processing unit 214 and a detection trigger and sound direction detection of specific sound recognition are included. Furthermore, an output of a temperature sensor (not shown) for detecting the environmental temperature may be included.

In step S603, for example, communication from an external device such as the smart device 401 is read and communication with the external device is performed if a communication instruction is given. That is, a remote operation from the smart device 401 via the wireless LAN or BLE and transmission/reception of data such as sound signals and image signals are performed. Also, an operation instruction process for imaging and the like from the smart device 401 to the imaging device 101, a process of reading whether or not there is a prescribed position detection notification based on GPS position information, and the like are also performed.

In step S613, it is determined whether a prescribed sampling period of time has elapsed or not. In step S604, a preset operation mode is determined. For example, the operation mode determined in step S604 is preset from the smart device 401 to the imaging device 101.

Also, if the operation mode is not set in advance by the smart device, a default may be set in the automated imaging mode.

Furthermore, in the first embodiment, there are an automated imaging mode, a manual imaging mode, and a reproduction mode as operation modes. The automated imaging mode is a mode in which automated imaging is performed on the basis of detection information (an image, sound, time, vibration, location, body change, environmental change, and the like), an elapsed period of time after switching to the automated imaging mode, past imaging information, and the like.

The automated imaging modes may have a plurality of automated imaging modes according to an imaging environment and an imaging scene. In the first embodiment, there is an outdoor automated imaging mode (a first automated imaging mode), which is an automated imaging mode in which outdoor imaging and scenes where there is a lot of movement of the object indoors are assumed. Also, the automated imaging modes include an indoor automated imaging mode (a second automated imaging mode), which is an automated imaging mode in which a scene in which there is little movement of the object indoors is assumed.

A manual imaging mode is an operation mode in which the imaging device 101, for example, performs an imaging operation based on an instruction from the smart device 401. In order to display a live image of the imaging device 101 on the display device of the smart device 401, the image transmission of the live image to the smart device 401 is performed and the imaging instruction is received from the smart device 401, so that a still image or a moving image is captured.

In the reproduction mode, for example, the transmission of a still image or a moving image designated from the smart device 401, which is a still image or a moving image within the imaging device 101, is performed according to an instruction from the smart device 401. These images may be the images themselves recorded in the imaging device 101 or may be reduced images, thumbnail images, or the like for performing a list display process or a reduced display process.

In step S701 of FIG. 7, as described above, the operation mode set by an instruction from the smart device 401 is determined. If the operation mode of the imaging device 101 is determined to be an automated imaging mode in step S701, a live view image is acquired in step S702 and an automated imaging process is performed in step S703.

If the operation mode is set as the manual imaging mode in step S701, a live image is received and transmitted to the smart device and it is determined whether there are an imaging setting and an imaging instruction of the smart device in step S704. In the case of Yes in step S704, the imaging process is performed in step S705. In the case of No in step S704, the process proceeds to step S706.

If the operation mode is determined to be the reproduction mode in step S701, an image reproduction process such as an image transmission or resizing process is performed in step S707 on the basis of a reproduction setting of the smart device 401.

In any one operation mode, it is determined whether there is an instruction to turn off the power supply in step S706. In the case of Yes, an end process is performed in step S708. If there is no instruction to turn off the power supply, a process of returning to step S613 continues.

Figure 8:
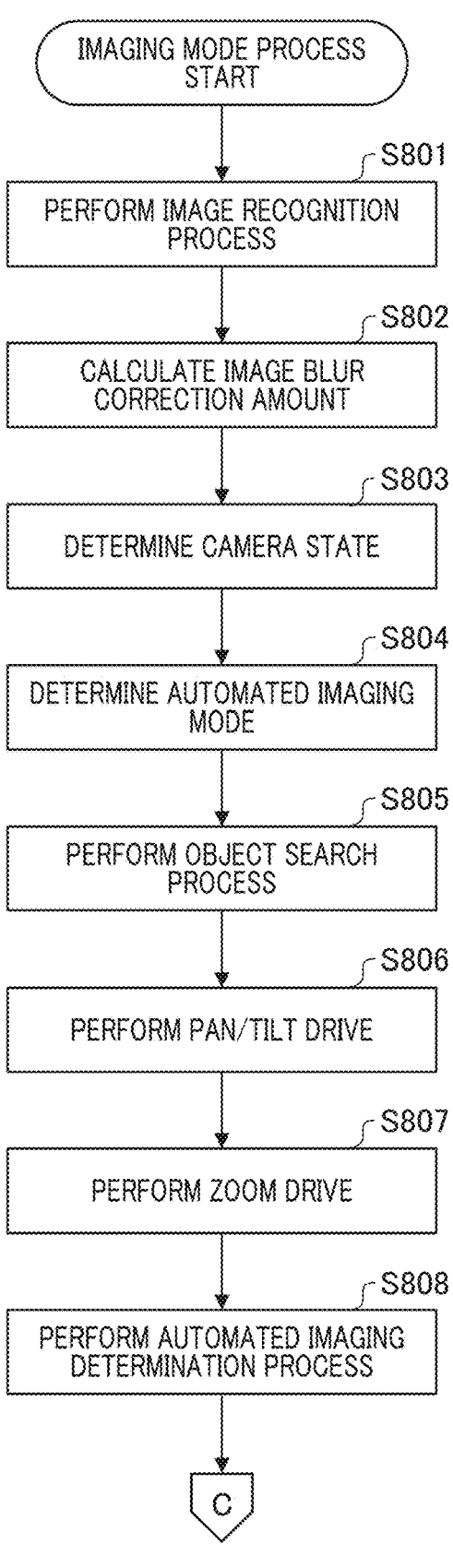
FIG. 8 is a flowchart for describing an automated imaging process in step S703 of FIG. 7.
Figure 9:
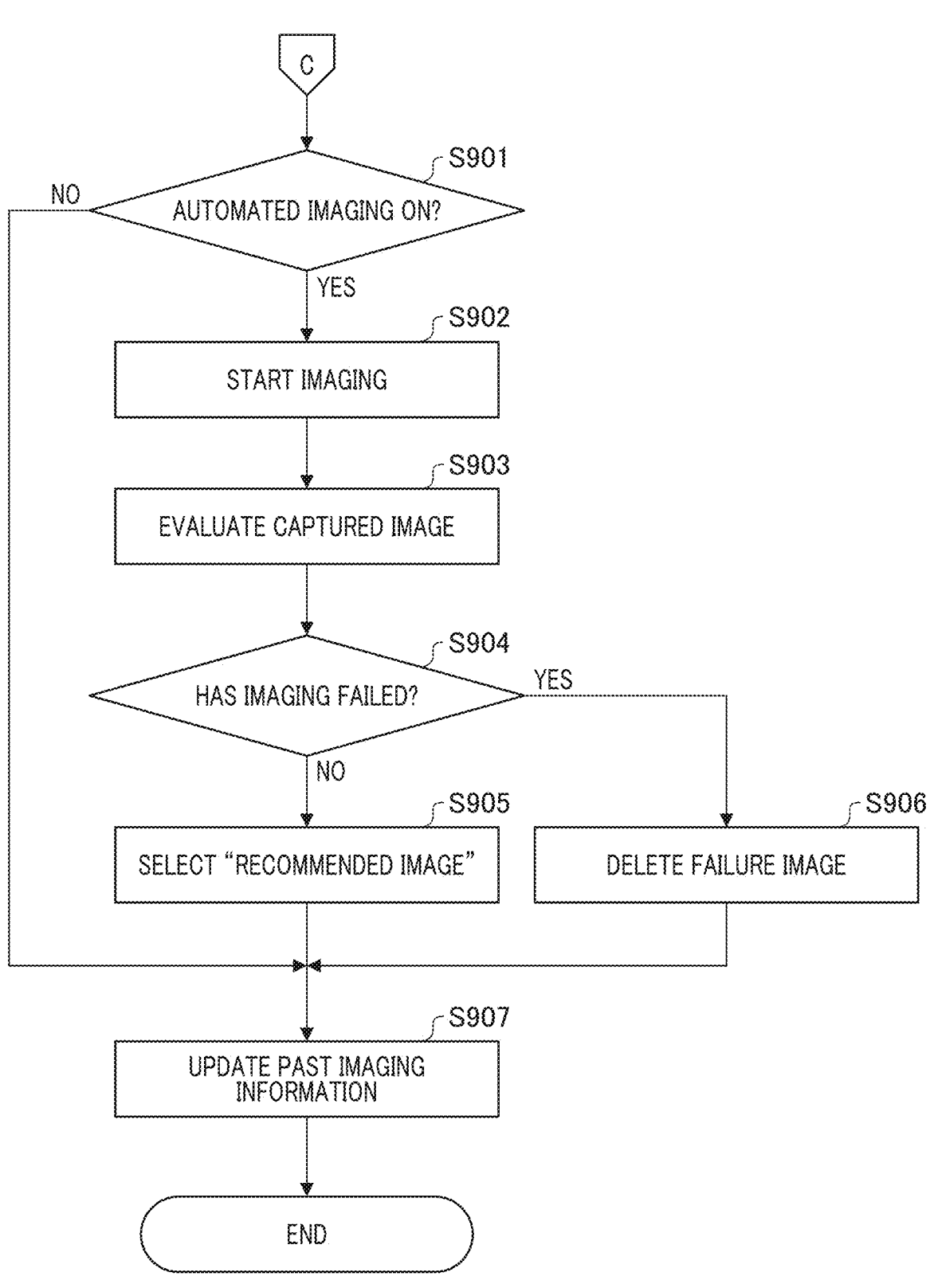
FIG. 9 is a flowchart subsequent to FIG. 8.

FIG. 8 is a flowchart for describing the automated imaging process in step S703 of FIG. 7 and FIG. 9 is a flowchart subsequent to FIG. 8.

Furthermore, the CPU or the like as a computer in the imaging device executes a computer program stored in the memory to perform operations for steps of the flowchart of FIGS. 8 and 9. As described above, the following process is controlled by the first control unit 223 of the imaging device 101 in the first embodiment.

In step S801, the image processing unit 207 performs image processing on the signal from the imaging unit 206 to generate an image for object recognition and perform object recognition (an image recognition process) such as person or physical object recognition from the generated image.

If a person is recognized, the object's face or human body is detected. In a face detection process, a pattern for determining the face of a person is predetermined and a portion matching the pattern included in the captured image can be detected as a face image of the person.

Also, a reliability degree indicating the certainty of the object's face is calculated from, for example, the size of the face area in the image, a matching degree with a face pattern, and the like. Likewise, in physical object recognition, a physical object matching a pre-registered pattern is recognized.

Also, a method of extracting a feature object using a histogram of a hue, a chroma, or the like within the captured image may be used. In this case, in relation to the image of the object captured within an angle of view of imaging, a process of dividing a distribution derived from a histogram of a hue, a chroma, or the like into a plurality of segments and classifying an image captured for each segment is executed.

For example, a histogram of a plurality of color components is created for the captured image and divided in a mountain-shaped distribution range, the captured image is classified as a region belonging to the same combination of segments, and the image area of the object is recognized.

By calculating an evaluation value for each image region of the recognized object, the image region of the object having a largest evaluation value can be determined as a main object region. In the above method, object information can be obtained from the imaging information. Here, step S801 functions as an object detection step (an object detection unit) that detects an object from an image acquired from the imaging unit.

In step S802, an image blur correction amount is calculated. Specifically, first, an absolute angle of the imaging device is calculated on the basis of angular velocity information and acceleration information acquired by the device shaking detection unit 209. Also, an anti-vibration angle for moving the tilt rotation unit 104 and the pan rotation unit 105 in the angular direction in which the absolute angle is canceled is obtained and the image blur correction amount is determined.

In step S803, a state of the imaging device (camera) is determined. On the basis of an angle and a movement amount detected using angular velocity information, acceleration information, GPS position information, and the like, a current vibration/movement state of the imaging device or the like is determined.

For example, if the imaging device 101 is attached to a car and performs an imaging process, object information such as the surrounding scenery changes significantly according to a movement distance. Therefore, it is possible to determine whether or not the state is a "moving object mounting state" in which the imaging device 101 is mounted in a moving object such as a car and is moving at a high speed and use the imaging device 101 for an automated object search to be described below.

Also, in step S803, it is determined whether or not the change in the angle is large and whether the imaging device 101 is in a "fixed imaging state" in which there is almost no shaking angle. In the case of the "fixed imaging state," it can be considered that there is no change in the angle of the imaging device 101 itself, so that an object search for fixed imaging can be performed. Also, if the angle change is relatively large, it is determined that the state is a "hand-held state" and a hand-held object search can be performed.

In step S804, a preset automated imaging mode is determined. Furthermore, the determination of the automated imaging mode may be the determination of the automated imaging mode set from the smart device or the determination may be performed if the automated imaging mode is set by the imaging device 101 itself.

In step S805, the object search process is performed. The object search process includes three processes: (a) "area division process," (b) "area-specific importance level calculation process," and (c) "search target area determination process" as follows.

(a) "area division process" will be described with reference to FIG. 10. FIGS. 10A to 10D are diagrams for describing imaging area detection in the automated imaging process in the first embodiment. As shown in FIG. 10A, an area division process is performed around the entire perimeter using a position of the imaging device (the origin O is set as the imaging device position) as the center.

In the example of FIG. 10A, each of a tilt direction and a pan direction are divided by 22.5 degrees. When they are divided as shown in FIG. 10A, the horizontal circumference decreases and the area decreases as the angle in the tilt direction moves away from 0 degrees. Consequently, as shown in FIG. 10B, if the tilt angle is 45 degrees or more, the horizontal area range is set to be larger than 22.5 degrees.

FIGS. 10C and 10D show examples of area division within the angle of view of imaging. An axis 1001 is a direction of the imaging device 101 at the time of initialization and the area division is performed using the angle in this direction as a reference position. Reference numeral 1002 denotes an area of an angle of view of the captured image and an example of an image at this time is shown in FIG. 10D. Within the image projected at the angle of view, the image is divided as denoted by reference numerals 1003 to 1018 of FIG. 10D on the basis of the area division.

In (b) "area-specific importance level calculation process," an importance level indicating the priority for performing a search is calculated in accordance with the situation of the object and the situation of the scene located within the area for each area divided as described above.

The importance level according to the situation of the object is calculated on the basis of, for example, the number of people located within the area, a size of the person's face, a face orientation, the accuracy of face detection, a facial expression of the person, and a personal authentication result of the person.

Also, the importance level according to the scene situation is calculated on the basis of, for example, a general physical object recognition result, a scene discrimination result (blue sky, backlight, sunset, or the like), a sound level coming from the direction of the area, a sound recognition result, movement detection information within the area, and the like. Also, when the state of the imaging device is determined in step S803, if a vibration state of the imaging device is detected, the importance level can also be changed according to the vibration state.

For example, if it is determined that the state is the "fixed imaging state," it is determined that the importance level is high when face authentication of a specific person is detected so that an object search is performed using an object having high priority (for example, a user of the imaging device or the like) registered in face authentication as the center.

Also, automated imaging, which will be described below, is also performed with priority given to the above-described face and many images captured by the user can be left by removing the imaging device and placing it on a desk or the like even if the user of the imaging device wears the imaging device and carries it around for a long time to perform imaging.

Because a search can be performed according to panning and tilting at this time, it is possible to leave a user image, a group photo of many faces, and the like by simply installing the imaging device appropriately even without considering the angle or the like when the imaging device is placed.

Furthermore, as long as there is no change in each area in the above-described conditions alone, the area with the highest importance level becomes the same and the area to be searched does not change much as a result. Therefore, the importance level is changed with past imaging information. Specifically, an area that has been continuously designated as a search area for a prescribed period of time may have its importance level lowered or its importance level may be lowered for a prescribed period of time.

In (c) "search target area determination process," after the importance level of each area is calculated as described above, the area having a high importance level is determined to be a search target area. Also, the pan/tilt search target angle necessary to capture the search target area as an angle of view is calculated.

In step S806, pan/tilt drive is performed. Specifically, a pan/tilt driving amount is calculated by adding a drive angle at a control sampling interval on the basis of an image blur correction amount and a pan/tilt search target angle.

Also, the tilt rotation unit 104 and the pan rotation unit 105 are driven and controlled by the lens barrel rotation drive unit 205 on the basis of the pan/tilt drive amount. Thus, in the first embodiment, the imaging direction control unit that controls the imaging direction of the imaging unit is provided and the imaging direction can be changed by the imaging direction control unit when automated imaging is performed.

In step S807, the zoom unit 201 is controlled and zoom drive is performed. Specifically, the zoom is driven in accordance with a state of the search target object determined in step S805. For example, when the search target object is a person's face, if the face in the image is excessively small, it cannot be detected because it falls below the minimum detectable size and there is a risk of losing sight of it. In such a case, a zoom-in process is performed to control the size of the face in the image so that the size is increased.

On the other hand, if the face in the image is excessively large, the object is easily deviated from the angle of view due to the movement of the object or the imaging device itself. In this case, control is performed so that the size of the face on the screen is reduced by performing a zoom-out process. By performing the zoom control in this way, a state suitable for tracking the object can be maintained.

Although a method of performing the object search according to the panning/tilting and the zoom drive has been described in steps S806 and S807, for example, a plurality of wide-angle lenses may be used to perform imaging in all directions at once to search for an object. In this regard, in the case of such an omnidirectional camera, a huge amount of processing is required when image processing such as object detection is performed using all signals obtained in imaging as input images.

Therefore, a configuration in which a part of the image is cut out and the object search process is performed in a cut image range is adopted. As in the method described above, the importance level for each area is calculated, the cutting position is changed on the basis of the importance level, and the automated imaging determination to be described below is performed. Thereby, it is possible to reduce power consumption according to image processing and to search for an object at a high speed.

In step S808, an automated imaging determination process is performed. In the automated imaging determination, (d) "determination of whether or not to perform automated imaging" and (e) "imaging method determination" (a single-still-image capturing process, a continuous still-image capturing process (a continuous imaging process), a moving-image capturing process, or the like) are performed. Also, the attitude of the imaging device may be detected on the basis of the acceleration of the imaging device 101 and an imaging method reflecting the user intention may be determined even during automated imaging.

(d) "determination of whether or not to perform automated imaging" is performed on the basis of the following two determinations. One determination process is a determination process of performing automated imaging if the importance level exceeds a prescribed value on the basis of the importance level for each area obtained in step S804.

The second determination process is a determination process based on a neural network and deep learning (hereinafter referred to as DL). It is assumed that a convolution neural network (hereinafter referred to as CNN) is used in general DL in the first embodiment and detailed description thereof is omitted in the first embodiment.

The determination based on the DL is, for example, determination based on the presence or absence of a moving object such as a person or pet, the presence or absence of an object such as a vehicle of a car, an aircraft, or the like, location in an image, the identification of a region, the identification of an individual, the position of the eyes of the object's face, a direction of the face, or the like.

In the first embodiment, the DL used to determine automated imaging is performed to determine a feature of an object such as a state of the object's face captured in the current angle of view and a registered specific person, the detection of the presence or absence of a feature object of a scene, or the like and to output a reliability degree indicating a high possibility of being an object along with object information.

If a value of the output object information or its reliability is greater than or equal to a threshold value, it is determined to perform automated imaging. As features of the object, a current zoom magnification, a general object recognition result at a current angle of view, a face detection result, the number of faces captured at the current angle of view, a smile degree/eye closing degree of the face, a face angle, a face recognition ID number, a gaze angle of an object person, a scene discrimination result, a result of detecting a specific composition, and the like are used.

Also, it may be determined to perform automated imaging using an elapsed period of time from previous imaging, a current time, GPS position information, an amount of change from a previous imaging position, a current sound level, the identification of a person who is uttering a sound, whether or not there is applause or cheering, and the like. Also, it may be determined to perform automated imaging using vibration information (acceleration information or the like), environmental information (a temperature, an air pressure, illuminance, humidity, or an ultraviolet amount), and the like of the imaging device 101.

In (e) "imaging method determination," an imaging method to be executed among a still-image capturing process, a moving-image capturing process, a continuous imaging process, and the like is determined on the basis of a state of the imaging device and a state of the surrounding object detected in steps S801 to S805.

For example, the still-image imaging process is executed if the object (person) is stationary and the moving-image imaging process or the continuous imaging process is executed if the object is moving. As in a process of determining whether or not to perform automated imaging on the basis of the DL, the imaging method may be determined on the basis of the DL.

If it is determined to perform imaging according to the automated imaging determination of step S808 in step S901, the process proceeds to step S902. Otherwise, the process proceeds to step S907.

In step S902, automated imaging is started. At this time, imaging based on the imaging method determined in step S808 is started and autofocus control is performed by the focus drive control unit 204.

Also, exposure control is performed so that the object has appropriate brightness using an aperture control unit (not shown), a sensor gain control unit, and a shutter control unit. Furthermore, after imaging, the image processing unit 207 performs various types of image processing such as an auto white balance process, a noise reduction process, and a gamma correction process to generate an image.

Furthermore, if a prescribed condition is satisfied in step S902, the imaging device 101 may notify the person serving as an imaging target that imaging is performed. A notification method may use, for example, a sound from the sound output unit 218 or light of an LED turned on by the LED control unit 224 or may be performed to perform a motion operation of visually guiding the object's visual line by driving panning/tilting.

The above-described prescribed conditions include, for example, conditions of whether the number of faces in the angle of view, the smile degree/eye closing degree of the face, the gaze angle or face angle of the object person, the face recognition ID number, the number of individuals registered for personal authentication, and the like satisfy prescribed conditions.

Also, the general object recognition result during imaging, the scene discrimination result, the elapsed period of time from the previous imaging time, the imaging time, whether or not a current position based on GPS information is a scenic spot, the sound level during imaging, the presence or absence of a person uttering a sound, whether or not applause or cheers have been raised, and the like may be conditions.

Also, vibration information (acceleration information and the like), environmental information (a temperature, an air pressure, illuminance, humidity, and an ultraviolet amount), and the like may be conditions. By performing imaging after providing a notification on the basis of these conditions, it is possible to leave a favorable image from the camera's perspective in a scene of high importance.

Also, a plurality of prescribed conditions are provided. In accordance with each condition, the sound may be changed, an LED lighting method (color, flashing time, or the like.) may be changed, or the pan/tilt motion method (a movement method or a drive speed) may be changed.

Regarding such a notification during imaging, it is also possible to determine the method and timing of the notification according to determination based on DL of information of the captured image or various types of information detected before imaging. Furthermore, step S902 functions as a control step (a control unit) of controlling an automated imaging process of the imaging unit on the basis of the object detection result.

In step S903, the captured image is evaluated. In step S904, it is determined whether the captured image is a failure image. The failure image determination may be performed by performing the determination based on the image or the determination of whether the image is a more preferable image on the basis of a state in which an object to be imaged is not imaged, the object has a blind eye, the expression is bad, or the exposure of the captured image is excessively dark or excessively bright, or the like.

Alternatively, in step S904, for example, a blurred image (an imaging failure) may be determined by calculating a motion vector value from an amount of deviation between a face detection position from the live image immediately before imaging and a face detection position based on the captured image and detecting a certain vector value or more.

Also, facial feature points such as the eyes, nose, and mouth of the detected face position may be detected in the face position detection and object blur determination may be performed according to position information, reliability of the feature points, or the like. The above-described process uses the fact that the reliability of the detection of facial organs such as the eyes and mouth of the face is low in the image in which the object is blurred.

As another method, a method may be used to extract the face area of the captured image and perform fast Fourier transformation (FFT) analysis of the face area to detect that there is a strong correlation in a specific frequency or direction. Alternatively, a method of performing the continuous imaging process and determining that the object has been blurred if deterioration has occurred due to extreme fluctuations in the contrast of the captured image during the continuous imaging process, a blur determination method based on the DL, or the like may be used.

In the case of the determination of No in step S904, the process proceeds to step S905 and a "recommended image" is selected. If the image has been selected as the "recommended image," for example, metadata called the "recommended image" is added (recorded) in an Exif format, for example, to the image file.

In automated imaging, because imaging is automatically continued when an object is detected while the power is turned on, the number of captured images increases and the user needs to see many images if the user views the images. Therefore, when the images are displayed in the smart device 401, it is desirable to display an image that has a good composition and a good expression from a plurality of images captured for a certain period of time, for example, in one day, or an image with a good expression of a person as the "recommended image."

In the "recommended image" selection method, a process of setting a photo with a good face size or expression of the object from the captured images as the "recommended image" is performed. Also, there is troublesome because the same photos are taken continuously for a certain period of time by performing automated imaging.

Therefore, if a recommended image can be acquired sufficiently in a similar scene, it may be determined not to be a recommended image any more. The similar scene determination may be a method of performing determination based on object information having similarity in the number of people that are objects using the DL, the sizes of their faces, and their expressions and the like, or performing personal authentication or physical object authentication based on the DL.

Alternatively, a method of acquiring a color composition ratio included in the image or a histogram for each color and employing statistical data having similarity in an average value or a variance value and the like or similar-image determination using control information of a PTZ camera, brightness information during imaging, and the like may be used.

In the case of Yes, i.e., if it is determined that the image is a failure image, in step S904, an image deletion process is performed in step S906. Alternatively, metadata called a "failure image" may be added (recorded) to the image in the Exif format without deleting the image. Accordingly, because images with low image quality can be deleted or selected according to the metadata, they can be hidden.

Thus, in the first embodiment, for example, in an indoor mode (the second automated imaging mode), even if an object-blurred image occurs, a function of automatically deleting the object-blurred image and a function of excluding the object-blurred image from recommended images are provided. Accordingly, it is possible to reduce the possibility that the user will be dissatisfied due to the increase in the number of object-blurred images.

In step S907, past imaging information is updated. Specifically, a count value of the number of images captured for each area described in the description of step S808, the number of images captured for each person registered for personal authentication, the number of images captured for each object recognized in general physical object recognition, the number of images captured for each scene of scene discrimination, the selected number of "recommended images," or the like are incremented by one.

Furthermore, in the automated PTZ camera, if the lens or lens barrel is covered with a dome-like cover, when light is applied to the dome-like cover or lens, diffuse reflection occurs between the inside of the dome and the lens and a flare phenomenon occurs. In an image in which a flare phenomenon occurs, a black floating phenomenon in which black floats throughout occurs, resulting in a decrease in the contrast and a decrease in the chroma.

Especially in indoor imaging, the imaging device 101 is close to the indoor lighting device and the imaging device 101 is installed on a low table or floor, so that the lens barrel of the PTZ camera tends to turn in the direction of the lighting device and a flare phenomenon is more likely to occur.

Furthermore, because there are many dark places indoors than outdoors, ISO sensitivity increases, and the black floating phenomenon occurs due to increased noise. Furthermore, many fluorescent lamps or many LED lights, which are indoor lighting devices, have a poor color rendering property and a poor color development property as compared with natural light such as sunlight.

Also, in an automated imaging camera having a PTZ function as shown in the first embodiment, object blur is likely to occur if objects such as children are imaged, and it is effective to perform imaging with a high-speed shutter. However, by increasing the shutter speed in indoor imaging as described above, the ISO sensitivity is further increased and contrast deterioration due to increased noise is likely to occur.

On the other hand, the F-number, which generally indicates the brightness of the lens, is expressed as F-number=focal length/effective aperture. As the focal length and the zoom magnification increase, the F-number increases, the lens becomes darker, and the ISO sensitivity tends to increase.

For example, if a zoom lens with a focal length of 24 mm and an F-number of F2.8 is used, when the optical zoom is doubled and the focal length is set to 48 mm, the F-number becomes F5.6 and the brightness of the lens is decreased by two steps on the assumption that the effective aperture of the lens is the same. In this case, in order to perform imaging at the same shutter speed and the same exposure level as when the focal length is 24 mm, it is necessary to increase the ISO sensitivity by two steps.

In fact, the effective aperture of the lens changes with the focal length, so the state is not necessarily as described above, but the F-number also increases and the ISO often increases as the focal length increases.

Thus, the imaging device 101 as a camera having an automated imaging function tends to perform imaging with high ISO sensitivity so that object blur is suppressed. Furthermore, in indoor imaging compared to outdoor imaging, the deterioration of the contrast or the deterioration of the chroma occurs due to multiple factors such as noise amplification and color rendering due to flare phenomenon and increased ISO sensitivity, and image quality often deteriorates. Especially in imaging at high zoom magnification indoors, image quality tends to deteriorate.

Therefore, in the first embodiment, automated imaging mode 1 (the first automated imaging mode) and automated imaging mode 2 (the second automated imaging mode) are provided as automated imaging modes. Automated imaging mode 1 is an automated imaging mode suitable for outdoor imaging and scenes where the object has a lot of movement, and automated imaging mode 2 is an automated imaging mode optimized for indoor imaging with little object movement.

In the first embodiment, in the above-described imaging environment where image quality is likely to deteriorate, the optical zoom magnification (focal length) is limited to less than a prescribed value if an indoor environment is detected or there is a setting by the user. Also, an image satisfying the user can be acquired by setting image generation parameters suitable for the indoor environment and setting a program diagram.

That is, in the second automated imaging mode, automated imaging is performed while limiting the focal length (zoom magnification) to less than a prescribed value. On the other hand, in the first automated imaging mode, automated imaging is performed using a focal length in a range of a prescribed value or more.

As described above, scenes where children are playing outdoors are prone to object blur in an environment where children can move around freely. On the other hand, in scenes where children are playing indoors, there are many scenes where children play with toys, draw, or watch TV, and children often move less.

In other words, there are fewer scenes that cause object blur compared to outdoor imaging. Also, in outdoor scenes, the object often moves to a position far from the imaging device 101, and it is highly necessary to perform imaging with a high zoom magnification (focal length). However, in indoor imaging, the size of the children's room and living room is sufficiently small compared to outdoors, and it is possible to image scenes of children playing even if imaging is performed with a low zoom magnification.

Hereinafter, exposure and brightness at the time of imaging will be described using Apex values. That is, the shutter speed is indicated by a time value (Tv), the F-number is indicated by an aperture value (Av), the ISO sensitivity is indicated by a sensitivity value (Sv), and the object brightness is indicated by a brightness value (Bv). Also, the exposure calculated from the Av and the Tv and the exposure conditions at the time of ISO 100 are expressed as the brightness of the object by the Ev.

Hereinafter, a method of calculating the Apex value will be described. The aperture value is denoted by F, the shutter speed is denoted by T [sec], and the brightness B is denoted by [cd/m$^2$]. They are defined by the following Eqs (1) to (4).

$$Bv = \log_2\{B/(0.32 \times K)\} \qquad \text{Eq. (1)}$$

$$Tv = \log_2(1/T) \qquad \text{Eq. (2)}$$

$$Av = \log_2 F^2 \qquad \text{Eq. (3)}$$

$$Sv = \log_2(0.32 \times REI) \qquad \text{Eq. (4)}$$

REI denotes a recommend exposure index of ISO sensitivity and REI=100 in the case of ISO 100. K denotes a number that varies with a camera manufacturer and has a value range of 11 to 14.

Also, values that are the light value (Lv) and the exposure value (Ev) are defined by Lv=Bv+Sv and Ev=Av+Sv. If Lv=Ev, the camera has an appropriate exposure.

Also, the Ev value at the time of ISO 100 can be used as an alternative to the object brightness Bv, and the outdoor brightness can be expressed as Ev by setting Ev=Bv+5 (object brightness of ISO 100).

Also, in the first embodiment, the sensor size of the imaging sensor is of, for example, (1/2.3) type. Also, because the noise in the image becomes noise that exceeds the noise reduction (NR) performance of image processing from around an ISO sensitivity of 1600, noise tends to worsen rapidly and it is desirable to keep the imaging by suppressing sensitivity to about ISO 800.

Therefore, in the first embodiment, it is possible to perform imaging by suppressing sensitivity to about ISO 800 according to (1) optical zoom limitation, (2) program diagram setting, and (3) image parameter setting for indoor imaging.

<(1) Optical Zoom Limitation>

Figure 11:
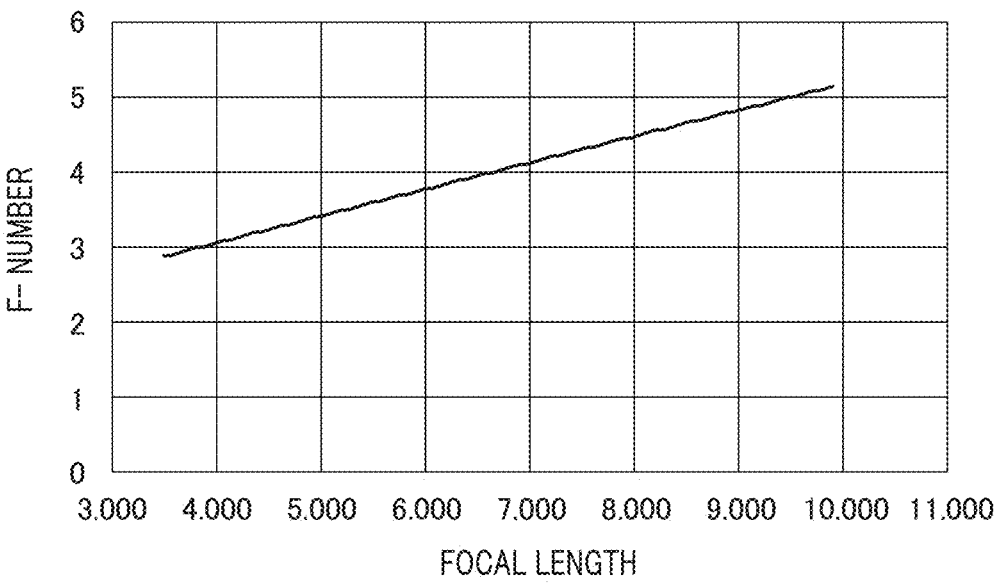
FIG. 11 is a diagram showing an example of a relationship between a focal length and an F-number in an indoor mode in the first embodiment.

FIG. 11 is a diagram showing an example of a relationship between the focal length and the F-number in the indoor mode in the first embodiment. For example, the focal length is set to f3.4 mm−10.2 mm (35 mm equivalent focal length of f19 mm−57 mm)/F3.4−F5.0 and the specification of the lens for each focal distance is, for example, as follows.

In a wide mode, the focal length is set to f3.4 mm (35 mm equivalent focal length of f19 mm)/F3.4. In an optical double mode, the focal length is set to f6.8 mm (35 mm equivalent focal length of f38 mm)/F4.0. Also, in a tele mode, the focal length is set to f10.2 mm (35 mm equivalent focal length of f57 mm)/F5.0. Also, in the case of the outdoor mode of automated imaging mode 1, the optical zoom can be used up to a value of 3×. In the case of the indoor mode of automated imaging mode 2, the optical zoom is limited to a value of 2×.

The lens condition for the longest focal length in the outdoor mode of automated imaging mode 1 becomes f10.2 mm/F5.0 and the lens condition of the longest focal length of automated imaging mode 2 (a double optical position) becomes f6.8 mm/F4.0. Also, the focal length of automated imaging mode 2 is 0.67 times that of automated imaging mode 1 and the brightness of the lens can be made 0.64 steps brighter.

<(2) Program Diagram Setting>

Figure 12:
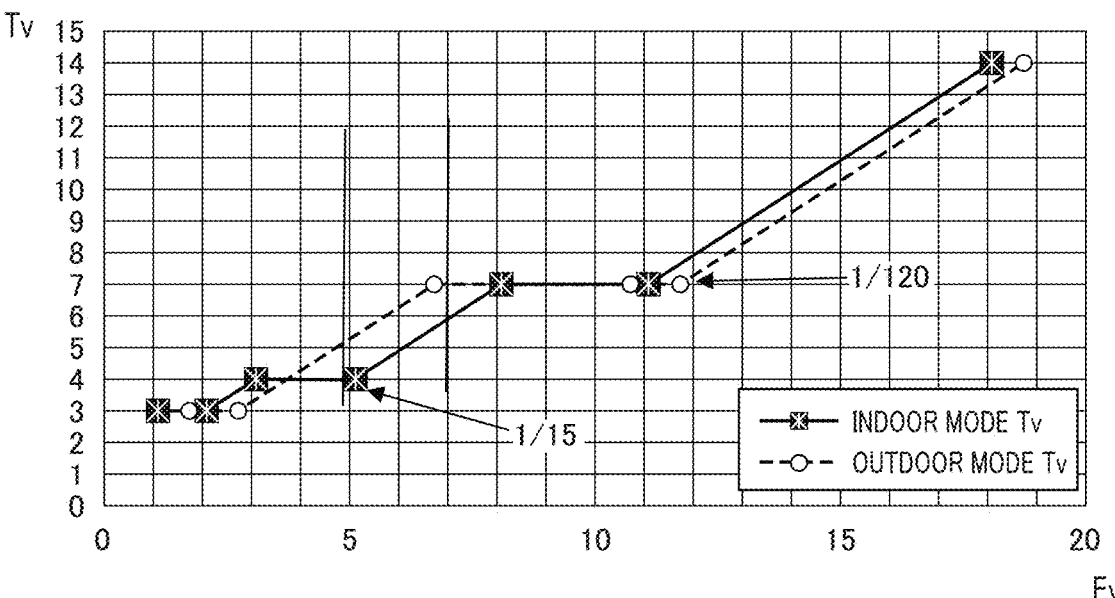
FIG. 12 is a program diagram showing a shutter speed set in the imaging device 101 for Ev (expressed in terms of ISO 100) of the brightness of an object.
Figure 13:
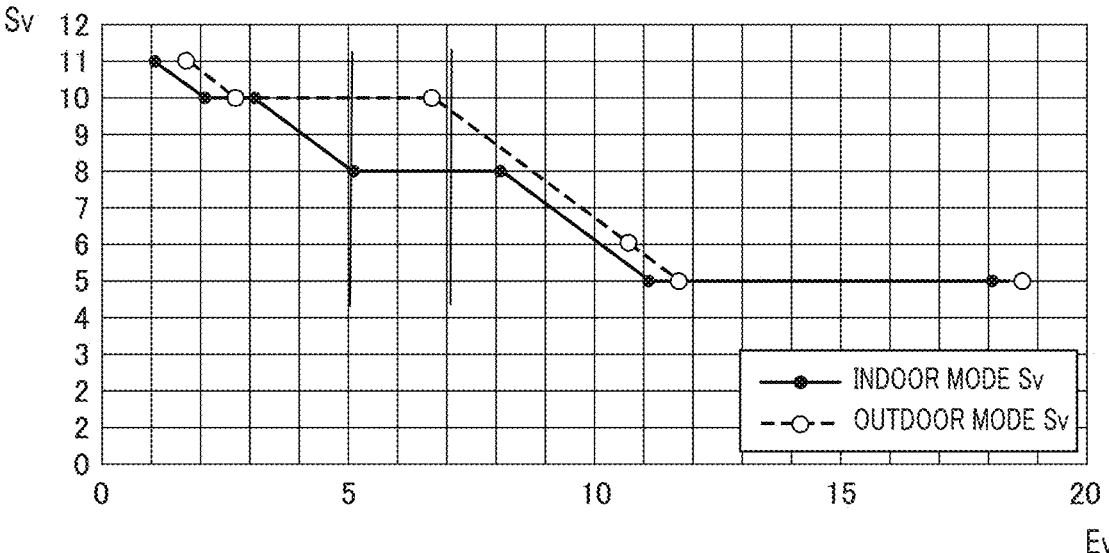
FIG. 13 is a program diagram showing ISO sensitivity of the brightness of the object to Ev (expressed in terms of ISO 100).

FIGS. 12 and 13 show examples of a program diagram when an optical zoom is limited in the outdoor imaging mode of automated imaging mode 1 and the indoor imaging mode of automated imaging mode 2 and the focal length of the lens is the largest value (Tele end) in each mode.

That is, FIG. 12 is a program diagram showing a shutter speed set in the imaging device 101 with respect to Ev (expressed in terms of ISO 100) of the brightness of the object, wherein the horizontal axis represents Ev and the vertical axis represents Tv. FIG. 13 is a program diagram showing the ISO sensitivity for Ev (expressed in terms of ISO 100) of the brightness of the object, wherein the horizontal axis represents Ev and the vertical axis represents Sv.

<(3) Image Parameter Setting for Indoor Imaging>

Figure 14:
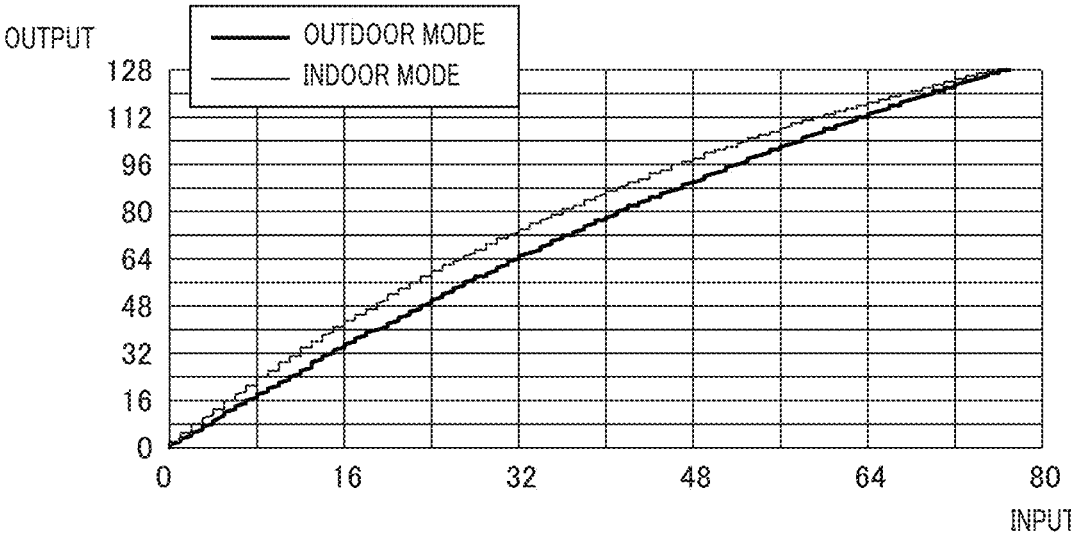
FIG. 14 is a diagram showing an example of gradation characteristics of an outdoor mode and an indoor mode in the first embodiment.

FIG. 14 is a diagram showing an example of gradation characteristics of the outdoor mode and the indoor mode in the first embodiment and shows gradation conversion characteristics in the gradation processing unit 305 in FIG. 3.

The input is indicated as 10 bits in a RAW format and the output is indicated as an 8-bit signal that is a Y signal in a JPEG format. In FIG. 14, a state of an output of Y=118, which is generally a reference for the brightness of a JPEG output at RAW=75 LSBs, is shown.

As shown in FIG. 14, when Y=0 at a dark spot that is the darkest part of the RAW format and the input of the RAW format as an AE target value is RAW=75 LSBs, the JPEG output becomes Y=118 LSBs and gradation characteristics of the outdoor mode (thick line) and indoor mode (thin line) are the same characteristics.

On the other hand, in the range of 20 to 56 LSBs for the RAW input, the gradation characteristics of the indoor mode become darker than those of the outdoor mode and the JPEG output Y is about 5 to 10 LSBs. These indicate that only the gradation characteristics of the dark part are darkened without changing the overall brightness of the image. That is, in the second automated imaging mode (indoor mode), the dark part gradation is darker than that of the first automated imaging mode (outdoor mode).

The above-described indoor flare phenomenon is often within the range of about 10 to 15 LSBs in Y of JPEG and the deterioration in the contrast based on the flare phenomenon and the black floating phenomenon due to noise can be suppressed by darkening the dark part gradation of the indoor mode to the extent shown in FIG. 14.

Figure 15:
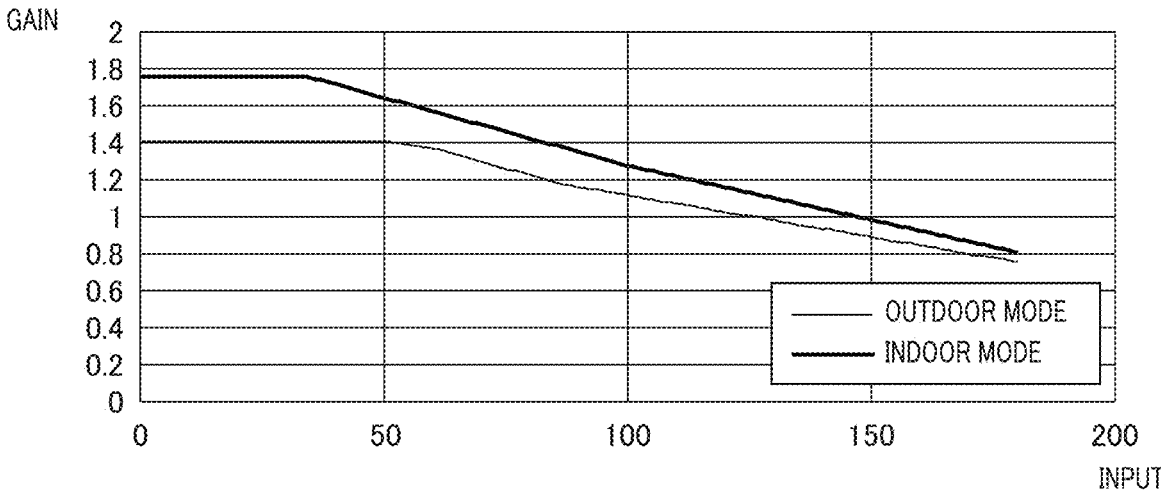
FIG. 15 is a diagram showing an example of chroma settings of the outdoor mode and the indoor mode in the first embodiment.

FIG. 15 is a diagram showing examples of chroma settings for the outdoor mode and the indoor mode in the first embodiment and shows an example of a chroma correction gain in the chroma correction processing unit 307 in FIG. 3. The input is a square root value of a sum of squares of the UV signal and the above-described value corresponds to a chroma signal in UV space input to the chroma correction processing unit 307. Also, the output is a gain value multiplied by the input UV signal.

As shown in FIG. 15, in the indoor mode, the gain is set to be high in the region of a low chroma and the gain is decreased and the chroma is suppressed in a high-chroma region. Also, the gain is 1.75× in the low-chroma range in the indoor mode and the gain is 1.4× in the outdoor mode.

That is, the second automated imaging mode is set to have a higher chroma than the first automated imaging mode. Thus, in the indoor mode, the gain of the chroma is set to be about 25% higher than in the outdoor mode and the gain difference between the modes is set to decrease as the chroma increases.

Figure 16:
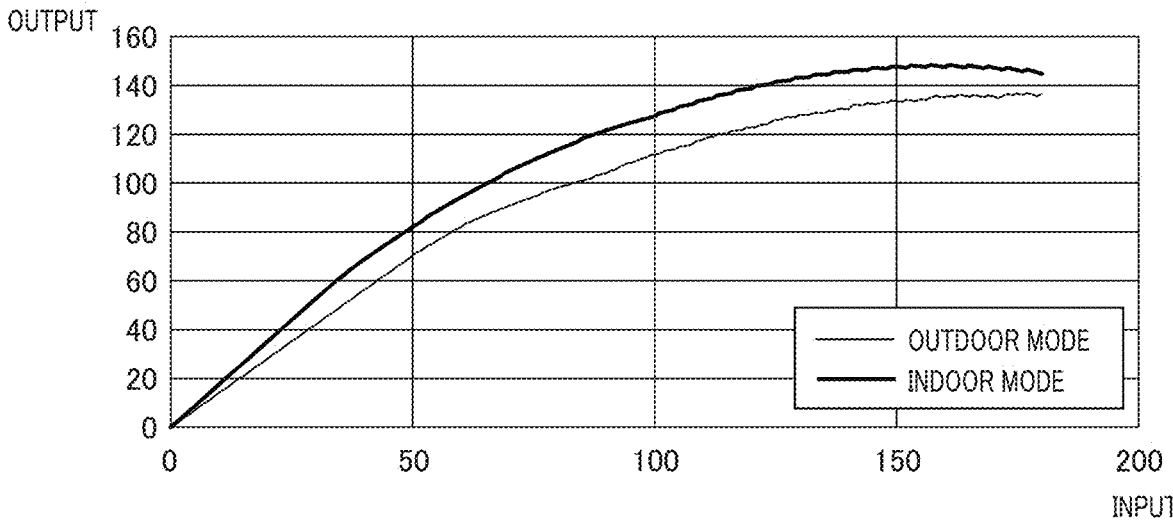
FIG. 16 is a diagram showing an example of chroma setting input/output characteristics in the first embodiment.

FIG. 16 is a diagram showing an example of the chroma setting input/output characteristics in the first embodiment, and shows the input/output characteristics of the square root value of the sum of squares of the UV signal input to the chroma correction processing unit 307. As shown in FIG. 16, in the first embodiment, the chroma enhancement ratio in the indoor mode is higher in the low-chroma region than in the outdoor mode and the chroma enhancement ratio is set to be close to that of the high-chroma region.

In the first embodiment, the program diagrams as shown in FIGS. 10 and 11 according to the above-described (1)

optical zoom limitation, (2) program diagram setting, and (3) image parameter setting for indoor imaging are shown in the indoor mode. Thereby, at Ev5-7 (Bv0-2), which is the indoor brightness, the Tv corresponds to a delay of 1.64 steps.

That is, in a range in which the brightness of the object is less than or equal to a prescribed value, the shutter speed of the second automated imaging mode is set to be lower than that of the first automated imaging mode in an imaging process. Thereby, it is possible to perform the imaging process by suppressing the ISO sensitivity to about ISO 800, which is two steps lower.

As described above, at ISO 3200 and ISO 800, there is a large difference in the noise included in the captured image and the captured image quality is significantly improved. Also, by optimizing the image parameters for indoor imaging, the sense of the contrast reduced due to the flare phenomenon is improved and the color reproduction can be clarified, and a good-looking image can be obtained.

Furthermore, as described above, in the first embodiment, by performing an automated imaging operation in the indoor imaging mode, the shutter speed is slowed down by 1.34 steps due to the indoor brightness, so there is a possibility that the number of images with object blur will increase. Also, in this case, there is a possibility that the capacity of a secure digital (SD) card and a built-in memory where the captured image is saved will be reduced due to unnecessary images.

Furthermore, there is a possibility that user satisfaction will decrease by increasing the opportunity for the user to view an image in which the object has blurred. However, in the first embodiment, as described in steps S904 to S906 of FIG. 9 in the indoor mode, the "recommended image" is selected, the failure image is deleted, and metadata is added. Accordingly, images with low image quality can be deleted or hidden by metadata.

That is, in the first embodiment, object blur greater than or equal to a prescribed value is detected from the captured image during the indoor mode of automated imaging mode 2 and the captured image is excluded from the "recommended image" if the captured image is determined to be a blurred image. Alternatively, metadata indicating a failure is assigned. Accordingly, if the object blur is greater than or equal to the prescribed value, the captured image can be automatically deleted or hidden.

Accordingly, it is possible to significantly reduce the opportunity for the user to view the object-blurred image due to the shutter speed reduction and it is possible to improve the image quality without lowering the user satisfaction. Furthermore, in the outdoor mode, because the shutter speed is set to be sufficiently high, the possibility of object blur is low and the above-described process is unlikely to be performed.

Second Embodiment

Figure 17:
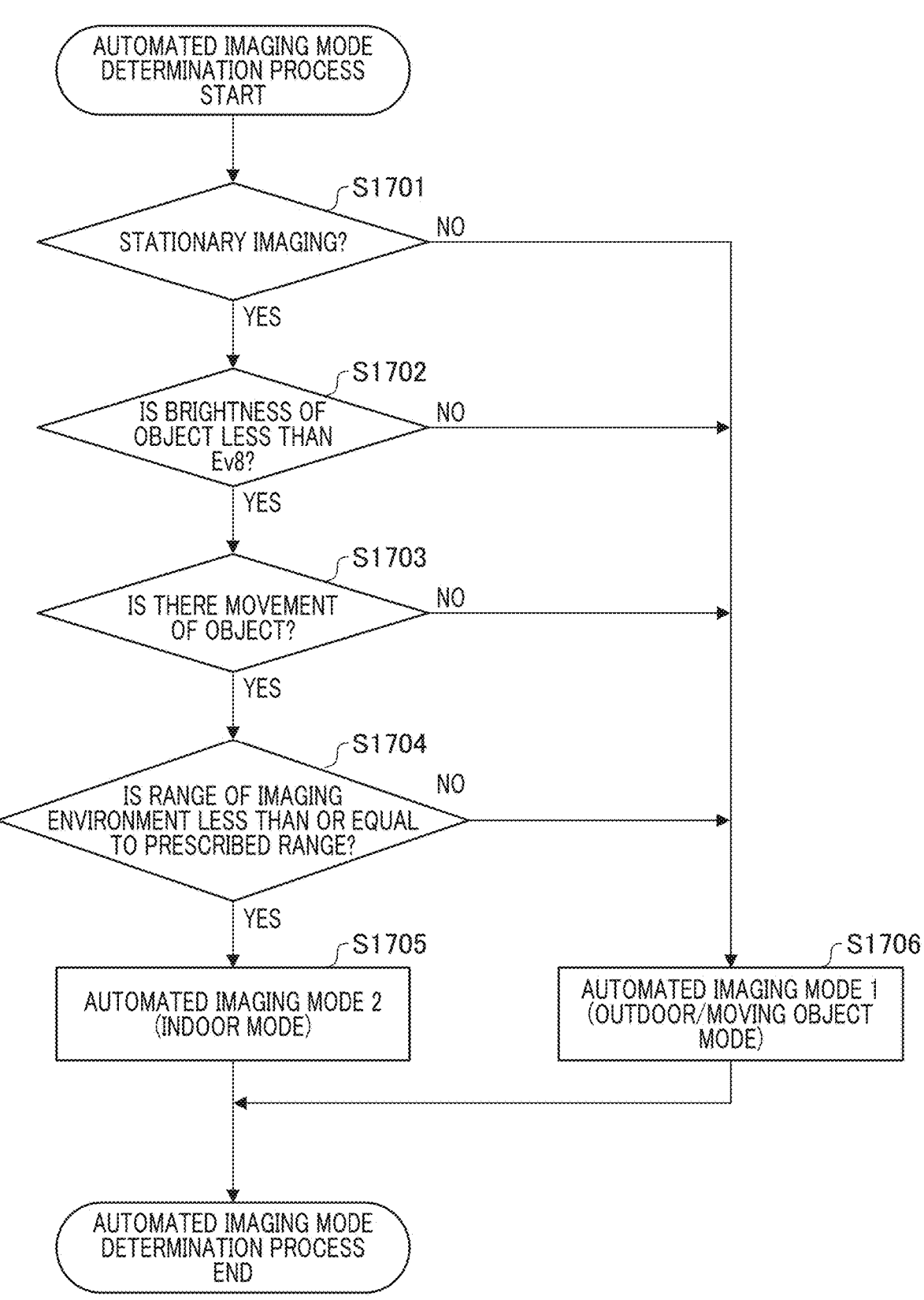
FIG. 17 is a flowchart showing a selection flow of an automated imaging mode in a second embodiment.

In a second embodiment, the automated imaging mode is automatically set in accordance with an imaging scene. FIG. 17 is a flowchart showing a selection flow of the automated imaging mode in the second embodiment and the imaging device 101 determines automated imaging mode 1 in which an outdoor area or a moving object is mainly imaged and automated imaging mode 2 in which indoor imaging is performed.

Also, the CPU or the like as a computer within the imaging device executes a computer program stored in the memory and the operation of each step of the flowchart of FIG. 17 is performed.

In step S1701 of FIG. 17, it is determined whether or not a stationary imaging (fixed imaging state) is performed and it is determined in step S1702 whether the brightness of the object is less than Ev8 if it is determined that the imaging is the stationary imaging is in step S1701.

Here, if the brightness of the object is less than Ev8, it is determined that the object is an indoor area. Furthermore, in FIGS. 12 and 13, a difference between indoor and outdoor program diagrams is larger in a place darker than that of Ev8 (Bv3).

Furthermore, because the blurring of the moving object becomes larger when the shutter speed becomes longer than the time of $\frac{1}{125}$, the indoor mode and the outdoor mode may be determined with the brightness of a period of time longer than the time of $\frac{1}{125}$.

If it is determined that the brightness of the object is less than Ev8 in step S1702, the movement of the object is determined in step S1703. In the motion determination of the object, the motion vector of the image may be calculated using a frame correlation between frames and it may be determined that there is movement if the motion vector is greater than or equal to a prescribed value. As another method, object detection based on the DL or the like, particularly, determination may be performed according to the location where a person is detected and coordinates on the image.

In step S1704, the surrounding distance is measured to determine whether a range of the imaging environment is less than or equal to a prescribed range. If it is determined that an average of the surrounding distances is less than a prescribed distance, the object is determined to be an indoor area. For example, as described with reference to FIG. 10, the PTZ function is used to perform imaging in all directions around the area and the distance is measured in each direction.

A method of determining the object as the indoor area if the average distance in all directions is, for example, less than 5 M, a method of determining the object as the indoor area if the distance is less than a prescribed value (for example, 5 M) by performing imaging in the upward direction of the camera, or the like may be used. Alternatively, if the size of the object such as the indoor area to be imaged is greater than or equal to a prescribed value, the object may be determined to be the indoor area.

The distance measurement may be any method, such as a method using the contrast auto focus (AF) function of the imaging device 101, distance measurement based on a phase difference, or measurement using a time of flight (TOF) sensor.

Furthermore, in the distance measurement based on contrast AF, a matching distance between a position of the focus lens and a focus is measured in advance and a lens position having the highest contrast is stored for each image area by driving the focus lens at the time of range measurement. Thereby, the distance of the surrounding environment may be measured.

As described above, in the case of Yes in all of steps S1701 to S1703 as measurement of the imaging environment, the indoor mode is set in step S1705. That is, if the object is determined to be in an indoor area on the basis of the object detection result (object situation), automated imaging is performed in the second automated imaging mode. The object situation includes any of the brightness of the object, the distance (range) around the imaging environment, and the size of the object to be imaged, or a combination thereof.

On the other hand, in the case of No in any one of steps S1701 to S1703, the automated imaging mode is set by setting the outdoor mode in step S1706. That is, on the basis of an object detection result, if it is determined that the object is in an outdoor area or a value of the movement of the object is greater than or equal to a prescribed value, automated imaging is performed in the first automated imaging mode.

Thus, in the second embodiment, the mode is switched between the first automated imaging mode in which automated imaging is performed using the focal length in a range of a prescribed value or more and the second automated imaging mode in which automated imaging is performed by limiting the focal length to less than the prescribed value on the basis of the object detection result. Also, one of a plurality of automated imaging modes including at least the first automated imaging mode and the second automated imaging mode to be used to perform automated imaging is selected in accordance with the object's situation.

Furthermore, in addition to the above, the indoor determination method may be a determination method based on a process of collating a GPS signal with map information or may be a method of determining the object as an indoor area when a communication environment is connected to a home Wi-Fi router or the like.

As described above, in the second embodiment, there are two automated imaging modes for an outdoor application and an indoor application. In the indoor automated imaging mode, a program diagram like FIGS. 12 and 13, an optical zoom magnification, or an image processing parameter is controlled.

Thereby, by setting the ISO sensitivity to ISO 800 at the brightness of, for example, Bv0-2, as the indoor brightness, noise can be suppressed and an image satisfactory to the user can be obtained. That is, in a range where the brightness of the object is less than or equal to a prescribed value, the sensitivity of the second automated imaging mode is set to be lower than that of the first automated imaging mode in the imaging process.

Furthermore, the shutter speed is slowed down by reducing the ISO sensitivity by 2 steps, but it is possible to suppress the decrease in the F-number by limiting the optical zoom magnification from 3× to 2× and it is possible to reduce a possibility of the object blur even in the indoor image process by reducing the decrease in the shutter speed.

Also, the flare phenomenon that tends to occur indoors and the phenomenon of color fading due to color rendering can be improved by adjusting the image parameters. Also, it is possible to suppress the decrease in user satisfaction due to object blur by automatically deleting object-blurred images and excluding the object-blurred images from the "recommended images" in the indoor imaging mode with respect to images in which the object has been blurred.

Also, as described above, the indoor imaging mode and the outdoor imaging mode may be set even if the user performs a setting process from a remote device. That is, the first automated imaging mode and the second automated imaging mode can be selected by the user. Furthermore, the automated imaging mode is automatically set by analyzing a result of detecting the object to be imaged. Accordingly, image quality can be improved without impairing usability.

Furthermore, the imaging device in the above-described embodiment is not limited to a digital camera or a digital video camera, but can also be mounted in a mobile terminal such as a surveillance camera, a Web camera, and a smartphone with a camera. Although a mode in which the imaging device controls automated imaging as a control device by itself has been described in the above-described embodiment, automated imaging can also be performed by receiving control from an external control device.

For example, object detection for an image received from the imaging unit 206 and automated imaging control based on an object detection result may be performed on the cloud.

While the present disclosure has been described with reference to exemplary embodiments, it is to be understood that the present disclosure is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the control device for the imaging device through a network or various storage media. Then, a computer (or a CPU, an MPU, or the like) of the control device for the imaging device may be configured to read and execute the program. In such a case, the program and the storage medium storing the program configure the present disclosure.

Also, the present disclosure, for example, includes technology implemented using at least one processor or circuit configured to function of the embodiments explained above. Furthermore, a distribution process may be performed using a plurality of processors.

This application claims the benefit of Japanese Patent Application No. 2023-000821, filed on Jan. 6, 2023, which is hereby incorporated by reference herein in its entirety.

What is claimed is:

1. A control device for an imaging device comprising:
at least one processor configured to function as:
an object detection unit configured to detect an object from an image acquired from an imaging unit; and
a control unit configured to control an automated imaging process of the imaging unit based on a result of detecting the object,
wherein the control unit has a first automated imaging mode in which the automated imaging process is performed using a focal length equal to or greater than a prescribed value and a second automated imaging mode in which the automated imaging process is performed by limiting the focal length to less than the prescribed value.

2. The control device for the imaging device according to claim 1, wherein in a range in which a brightness of the object is less than or equal to a prescribed value, imaging is performed in a state in which sensitivity of the second automated imaging mode is lower than sensitivity of the first automated imaging mode.

3. The control device for the imaging device according to claim 1, wherein in a range in which a brightness of the object is less than or equal to a prescribed value, imaging is performed in a state in which a shutter speed of the second automated imaging mode is lower than a shutter speed of the first automated imaging mode.

4. The control device for the imaging device according to claim 1, wherein dark part gradation in the second automated imaging mode is darker than dark part gradation in the first automated imaging mode.

5. The control device for the imaging device according to claim 1, wherein a chroma in the second automated imaging mode is set to be higher than a chroma in the first automated imaging mode.

6. The control device for the imaging device according to claim 1, wherein, in a case in which object blur of a captured image is greater than or equal to a prescribed value, the captured image is automatically deleted or hidden.

7. The control device for the imaging device according to claim 1, wherein the at least one processor is further configured to function as an imaging direction control unit configured to control an imaging direction of the imaging unit, and wherein, when the automated imaging process is performed, the imaging direction is changeable by the imaging direction control unit.

8. The control device for the imaging device according to claim 1, wherein the control unit selects the automated imaging process to be performed using any one of a plurality of automated imaging modes in accordance with a situation of the object, wherein the plurality of automated imaging modes includes at least the first automated imaging mode and the second automated imaging mode.

9. The control device for the imaging device according to claim 1, wherein the control unit performs the automated imaging process in the second automated imaging mode in a case in which it is determined imaging is performed in an indoor imaging mode based on the result of detecting the object.

10. The control device for the imaging device according to claim 1, wherein the control unit performs the automated imaging process in the first automated imaging mode in a case in which it is determined that imaging is performed in an outdoor imaging mode or a value of an or movement of the object is greater than or equal to a prescribed value on the basis of the result of detecting the object.

11. The control device for the imaging device according to claim 1, wherein the result of detecting the object includes at least one of brightness of the object, a distance around an imaging environment, and a size of the object to be imaged.

12. The control device for the imaging device according to claim 1, wherein the first automated imaging mode and the second automated imaging mode can be selected by a user.

13. An imaging device comprising:

an imaging unit; and at least one processor configured to function as:

an object detection unit configured to detect an object from an image acquired from the imaging unit; and a control unit configured to control an automated imaging process of the imaging unit based on a result of detecting the object, wherein the control unit has a first automated imaging mode in which the automated imaging process is performed using a focal length equal to or greater than a prescribed value or more and a second automated imaging mode in which the automated imaging process is performed by limiting the focal length to less than the prescribed value.

14. The imaging device according to claim 13, wherein the at least one processor is further configured to function as an imaging direction control unit configured to change an imaging direction of the imaging unit based on a control process of the control unit.

15. The imaging device according to claim 13, wherein the at least one processor is further configured to function as a communication unit configured to transmit the captured image to an external device for evaluating object blur based on the captured image.

16. An imaging method comprising:

detecting an object from an image acquired from the imaging unit; and controlling an automated imaging process of the imaging unit on the basis of a result of detecting the object, wherein the controlling has a first automated imaging mode in which the automated imaging process is performed using a focal length in a range of a prescribed value or more and a second automated imaging mode in which the automated imaging process is performed by limiting the focal length to less than the prescribed value.

17. A non-transitory computer-readable storage medium configured to store a computer program comprising instructions for executing following processes:

detecting an object from an image acquired from the imaging unit; and controlling an automated imaging process of the imaging unit on the basis of a result of detecting the object, wherein the controlling has a first automated imaging mode in which the automated imaging process is performed using a focal length in a range of a prescribed value or more and a second automated imaging mode in which the automated imaging process is performed by limiting the focal length to less than the prescribed value.

\* \* \* \* \*